United States Patent
Nishimura

[11] Patent Number: 5,935,701
[45] Date of Patent: *Aug. 10, 1999

[54] SUPER-RESOLUTION MAGNETO-OPTIC RECORDING MEDIUM USING IN-PLANE MAGNETIC FILM AND INFORMATION REPRODUCING METHOD USING THE MEDIUM

[75] Inventor: Naoki Nishimura, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/535,840

[22] Filed: Sep. 28, 1995

[30] Foreign Application Priority Data

Oct. 5, 1994 [JP] Japan .................................. 6-241096

[51] Int. Cl.⁶ ...................................................... G11B 5/66
[52] U.S. Cl. ................. 428/332; 428/336; 428/694 ML; 428/694 MM; 428/694 SC; 428/694 RL; 428/694 T; 428/900; 369/13
[58] Field of Search ....................... 369/13; 428/694 ML, 428/694 MM, 694 SC, 694 RL, 694 T, 332, 336

[56] References Cited

U.S. PATENT DOCUMENTS

| | | | |
|---|---|---|---|
| 5,094,925 | 3/1992 | Ise et al. | 428/694 MM |
| 5,248,565 | 9/1993 | Tsutsumi et al. | 428/694 EC |
| 5,428,585 | 6/1995 | Hirokane et al. | 369/13 |
| 5,452,272 | 9/1995 | Murakami et al. | 369/13 |
| 5,488,604 | 1/1996 | Negishi | 369/275.2 |

FOREIGN PATENT DOCUMENTS

| | | |
|---|---|---|
| 0545690 | 6/1993 | European Pat. Off. . |
| 0586175 | 3/1994 | European Pat. Off. . |
| 0592199 | 4/1994 | European Pat. Off. . |
| 0606155 | 7/1994 | European Pat. Off. . |
| 0652556 | 5/1995 | European Pat. Off. . |
| 6-124500 | 5/1994 | Japan . |

OTHER PUBLICATIONS

Patent Abstracts of Japan, vol. 016, No. 243, published Jun. 4, 1992 English Abstract of Japanese Patent No. 4–053047.

Patent Abstracts of Japan, vol. 017, No. 141, published Mar. 23, 1993, English Abstract of Japanese Patent No. 4–313833.

Patent Abstract of Japan, vol. 18, No. 184, published Mar. 29, 1994, Englishe Abstract of Japanese Patent No. 5–342677.

*Primary Examiner*—Leszek Kiliman
*Attorney, Agent, or Firm*—Fitzpatrick, Cella, Harper & Scinto

[57] ABSTRACT

A magneto-optic recording medium of the present invention has a transparent substrate. A reproducing layer is stacked on the substrate, and remains in an in-plane magnetic state at room temperature and is transformed into a perpendicular magnetic state at an increased temperature. A first recording layer for storing information therein is stacked on the reproducing layer. In the first recording layer, the perpendicular magnetic state is maintained in a temperature range of from room temperature to the Curie temperature. A second recording layer for storing information therein is stacked on the first recording layer. In the second recording layer, the perpendicular magnetic state is maintained in a temperature range of from room temperature to the Curie temperature. The sub-lattice magnetic moment of an element forming the second recording layer is oriented in the direction opposite to the magnetic moment of the first recording layer. A same type of elements being used for the first and second recording layers. The rotation of the plane of polarization of incident light generated in the reproducing layer at a magnetic wall domain is canceled by the rotation angles of the planes of polarization of the incident light generated in the first and second recording layers.

14 Claims, 15 Drawing Sheets

TEMPERATURE DISTRIBUTION
AT THE CENTER OF THE TRACK
IN THE DISK MOVING DIRECTION

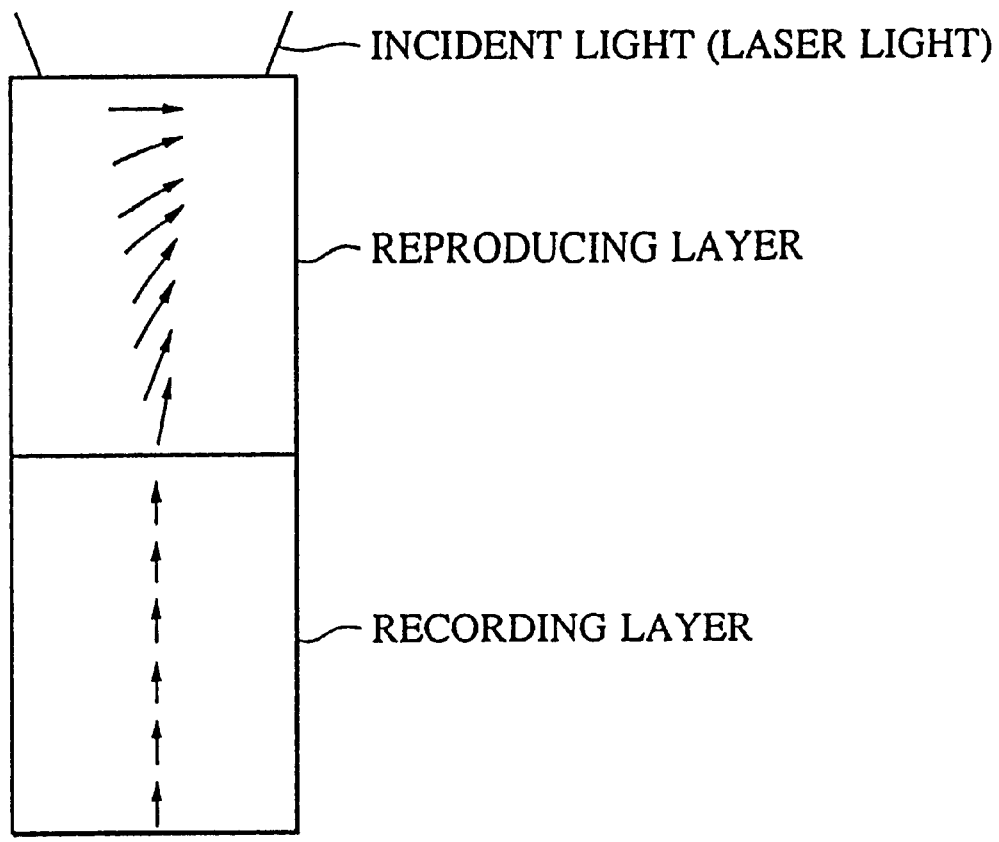

FIG. 4(a)
FIG. 4(b)
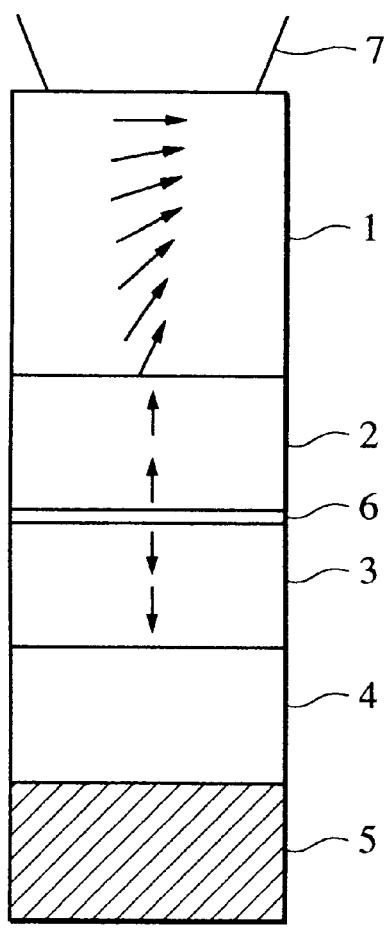
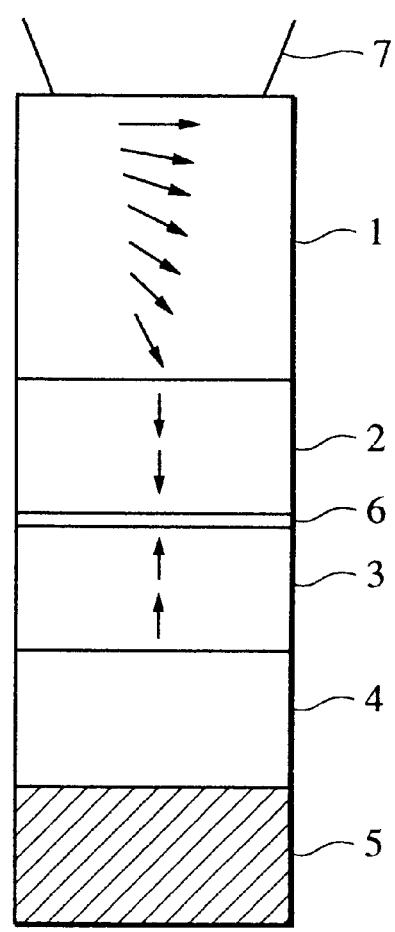

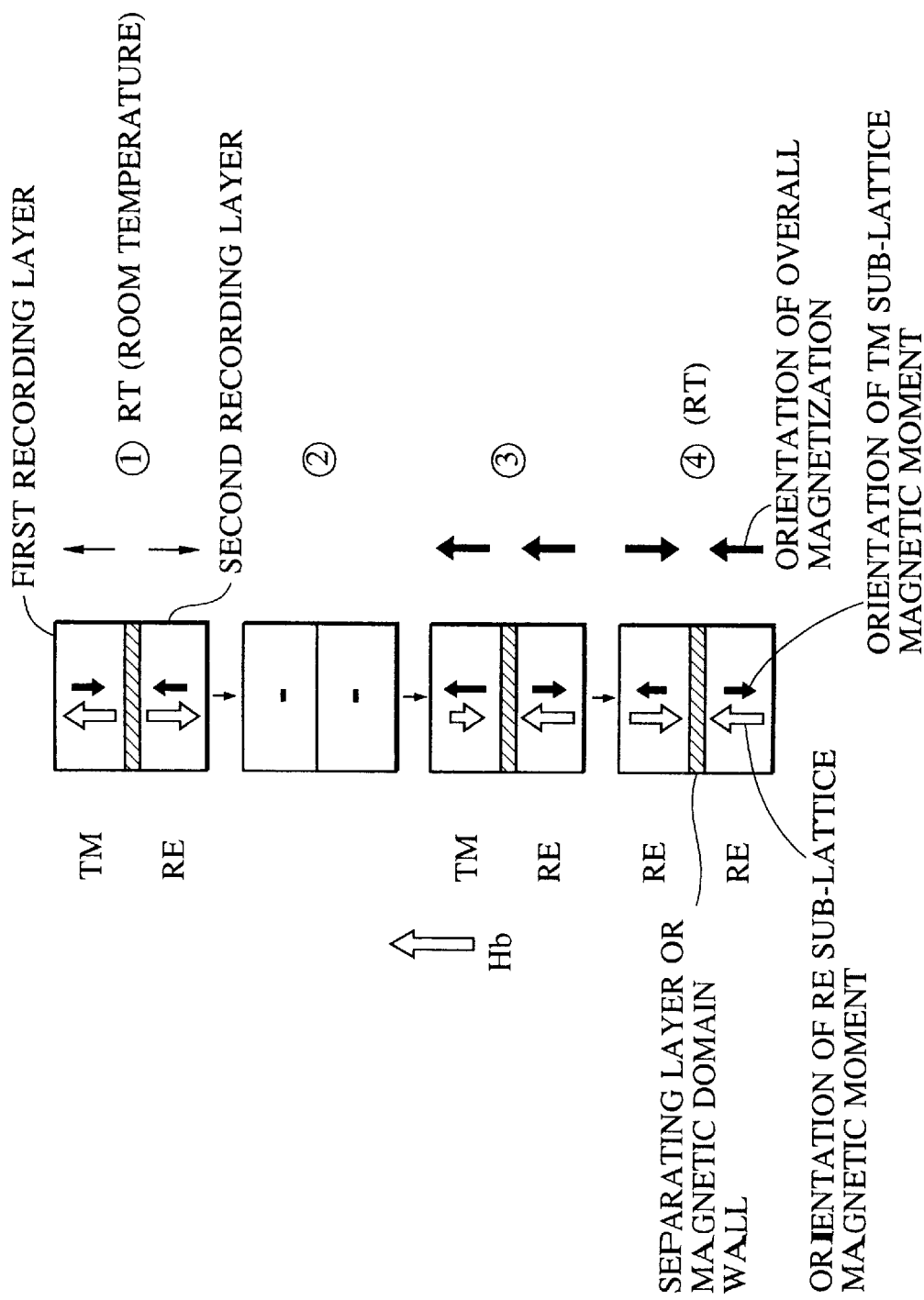

SUPER-RESOLUTION MAGNETO-OPTIC RECORDING MEDIUM USING IN-PLANE MAGNETIC FILM AND INFORMATION REPRODUCING METHOD USING THE MEDIUM

BACKGROUND OF THE INVENTION

1. Field of the Invention

The present invention relates to a magneto-optic recording medium onto and from which information is recorded and reproduced by means of a laser beam. More particularly, the invention relates to a high-density magneto-optic recording medium and an information reproducing method using the recording medium.

2. Description of the Related Art

Attention is being focused on a magneto-optic recording medium for use in an erasable high-density recording method in which information is recorded by forming magnetic domains in a magnetic thin layer using the thermal energy of a semiconductor laser, and the information is read from the magnetic domains by use of the magneto-optic effect. There is an increasing demand for increasing the recording density of this type of recording medium in order to obtain a larger capacity.

The linear recording density of an optical disk, such as the above-described type of magneto-optic recording medium, significantly depends on the laser wavelength $\lambda$ of a reproducing optical system and the numerical aperture (NA) of an object lens. In other words, the reproducing optical wavelength $\lambda$ and the numerical aperture NA of the object lens determine the size of a beam waist. Accordingly, the smallest possible mark to be reproduced is as low as $\lambda/2NA$. On the other hand, the track density, as well as the smallest mark, is primarily restricted by crosstalk between adjacent tracks, and thus relies on the spot size of a reproducing beam. Accordingly, it is necessary to shorten the laser wavelength $\lambda$ of a reproducing optical system or to increase the numerical aperture NA of an object lens to increase the density of a conventional optical disk. It is not easy, however, to shorten the laser wavelength because of the efficiency and heat generation of devices. Also, an increase in the numerical aperture NA of the object lens will make the working of a lens complicated and also cause mechanical problems, for example, the proper distance between the lens and the disk cannot be sufficiently ensured, causing the two elements to collide with each other. In view of this background, a technique for improving recording density is under development by enhancing the construction of a recording medium or improving the method of reading information.

Meanwhile, the present inventors have attempted to develop a magneto-optic recording medium which can achieve magnetic super-resolution without applying a reproducing magnetic field. They have also attempted to develop an information reproducing method using this medium.

For example, the present inventors have suggested a magneto-optic recording medium constructed as shown in FIG. 1, as disclosed in Japanese Patent Laid-Open No. 6-124500. This publication discloses a super-resolution technique for attaining a recording density higher than the optical resolving power of the reproducing light. FIG. 1A is a sectional view of an optical disk representing a super-resolution technique by way of example. The arrows shown in the magnetic layers indicate the directions of the sub-lattice magnetization of, for example, an iron-group element contained in the magnetic layers. A recording layer 42 is formed of a TbFeCo or DyFeCo film exhibiting a high level of perpendicular magnetic anisotropic characteristics. The recording information is recorded and stored in the form of magnetic domains in the upward direction or the downward direction relative to the surface of the film. A reproducing layer 41 remains in the form of an in-plane magnetic film at room temperature, but is transformed into a perpendicular magnetic film when the temperature is raised to reach Tm (described below). For reproducing the information, light is applied to a side of a substrate 20 of the disk formed of the medium constructed as described above. The resulting temperature gradient at the center of the data track is indicated as shown in FIG. 1C. As this temperature gradient is viewed from the substrate 20, a Tm isothermal line can be seen within a light spot 22, as shown in FIG. 1B. As described above, a region of the reproducing layer at a temperature lower than Tm remains in the form of the in-plane magnetic film, which does not contribute to a high level of the Kerr effect (a front mask 24 is formed). Accordingly, recording magnetic domains stored in the recording layer 42 are masked and unseen. On the other hand, a region of the reproducing layer 41 at a temperature of Tm or higher is transformed into the state of a perpendicular magnetic film, and the magnetization in such a region is oriented in the same direction as the recorded information due to an exchange interaction coupling force with the recording layer 42. As a result, recording magnetic domains stored in the recording layer 42 are transferred only to an aperture 23 smaller than the light spot 42, thereby realizing super-resolution.

In this known super-resolution reproducing method, the track density, as well as the linear recording density, can be improved with the arrangement in such a manner that the front mask 24 located in the low-temperature region extends along an adjacent track.

However, the super-resolution magneto-optic recording medium constructed of double layers using the in-plane magnetic film presents the following problems.

The magnetic information stored in the recording layer can be sufficiently masked when in-plane anisotropic characteristics in the reproducing layer are increased to a higher level at room temperature. It is difficult, however, to completely transform the reproducing layer to the state of a perpendicular magnetic film at a reproducing temperature. Conversely, when in-plane anisotropic characteristics are decreased to a lower level at room temperature, the reproducing layer is completely transformed into the state of a perpendicular magnetic film at a reproducing temperature. At room temperature, an interfacial magnetic domain wall generated between the reproducing layer and the recording layer is generally biased toward the reproducing layer, as illustrated in FIG. 2. More specifically, perpendicular magnetic components representing the magnetic information stored in the recording layer are disadvantageously generated in a portion of the reproducing layer adjacent to the recording layer. It is thus difficult to completely mask the magnetic information stored in the recording layer with the reproducing layer. As a consequence, when the recording mark or the track width is decreased in the above type of conventional recording medium, good reproducing signals cannot be easily obtained.

Also, in this recording medium, it is necessary that the reproducing layer be formed thick enough to mask the information in the form of the magnetic domains stored in the recording layer in order to obtain a high degree of S/N (signal-to-noise) ratio (C/N ratio). More specifically, as disclosed in Japanese Patent Laid-Open No. 4-25593, the reproducing layer having a thickness of 150 Å or smaller produces an adverse influence on the layer just below the reproducing layer by 25% or greater, which makes it impossible to achieve super-resolution reproducing. Accordingly, it is necessary that the thickness of the reproducing layer be in a range of from 200 Å to 300 Å or higher in order to obtain signals having a high degree of S/N ratio required for practical use. In the manner described above, in this recording medium, the thickness of the overall magnetic layers including the reproducing layer cannot be reduced, since it is necessary to mask the information in the form of magnetic domains stored in the recording layer.

There is an increasing demand for enhancing recording density by increasing the linear velocity of a magneto-optic recording medium. However, it is difficult to meet this demand for the recording medium because of the following reason. There is a limitation for the output of the optical power, such as a semiconductor laser, although a large amount of optical power is required for recording information onto a medium provided with a thick magnetic layer having a large heat capacity. This also means that a reflective layer cannot be disposed to form the medium in the enhanced structure, and thus, the C/N ratio cannot be increased. Further, metal formed of a rare-earth element, which is costly, is generally used for magnetic layers, which further increases the costs of the overall recording medium provided with thick magnetic layers. Because of these reasons, it is difficult to provide an inexpensive magneto-optic recording medium in which the higher density by means of super-resolution can be achieved simultaneously with faster recording.

SUMMARY OF THE INVENTION

Accordingly, in order to solve the above-described problems, an object of the present invention is to provide a magneto-optic recording medium in which magnetic information stored in a recording layer can be sufficiently masked in a temperature range of from room temperature to high temperatures, and such information can be sufficiently reproduced in a high temperature region of a reproducing beam spot.

In order to achieve the above object, the present invention provides a magneto-optic recording medium comprising: a transparent substrate; a reproducing layer stacked on the substrate, remaining in an in-plane magnetic state at room temperature and being transformed into a perpendicular magnetic state at an increased temperature; a first recording layer stacked on the reproducing layer, for storing information therein in which the perpendicular magnetic state is maintained in a temperature range of from room temperature to the Curie temperature; and a second recording layer stacked on the first recording layer, for storing information therein in which the perpendicular magnetic state is maintained in a temperature range of from room temperature to the Curie temperature and a sub-lattice magnetic moment of an element forming the second recording layer is oriented in the direction opposite to the magnetic moment of the first recording layer, a same type of elements being used for the first and second recording layers, wherein the rotation of the plane of polarization of incident light generated in the reproducing layer at a magnetic wall domain is canceled by the rotation angles of the planes of polarization of the incident light generated in the first and second recording layers.

The present invention also provides a method of reproducing information by applying a laser beam in the form of a spot to a magneto-optic recording medium of the type which comprises: a transparent substrate; a reproducing layer stacked on the substrate, remaining in an in-plane magnetic state at room temperature and being transformed into a perpendicular magnetic state at an increased temperature; a first recording layer stacked on the reproducing layer, for storing information therein in which the perpendicular magnetic state is maintained in a temperature range of from room temperature to the Curie temperature; and a second recording layer stacked on the first recording layer, for storing information therein in which the perpendicular magnetic state is maintained in a temperature range of from room temperature to the Curie temperature and a sub-lattice magnetic moment of an element forming the second recording layer is oriented in the direction opposite to the magnetic moment of the first recording layer, a same type of elements being used for the first and second recording layers, wherein the rotation of the plane of polarization of the incident laser beam generated in the reproducing layer at a magnetic wall domain is canceled by the rotation angles of the planes of polarization of the incident laser beam generated in the first and second recording layers, the method comprising the steps of: transforming a high-temperature region within the spot of the reproducing layer to the perpendicular magnetic state and coupling the reproducing layer and the first recording layer due to exchange interaction, thereby transferring the information stored in the first recording layer to the reproducing layer; maintaining the in-plane magnetic state in a low-temperature region within the spot of the reproducing layer; and reproducing the information due to a magneto-optic effect of a reflected light of the laser beam.

Further objects, features and advantages of the present invention will become apparent from the following description of the preferred embodiments with reference to the attached drawings.

BRIEF DESCRIPTION OF THE DRAWINGS

FIG. 1 illustrates an information reproducing method employed in a conventional magneto-optic recording medium:

FIG. 2 is a sectional view of the structure of the magnetization of the medium shown in FIG. 1 at room temperature;

FIG. 3 illustrates the construction of the layers of a magneto-optic recording medium according to the present invention:

FIG. 4 is a sectional view of the structure of the magnetization of an magneto-optic recording medium according to the present invention at room temperature:

FIG. 4A illustrates a first recording layer in which magnetization is oriented in the upward direction;

FIG. 4B illustrates a first recording layer in which magnetization is oriented in the downward direction;

FIG. 5 is a sectional view of the structure of the magnetization of a magneto-optic recording medium according to the present invention at an increased temperature:

FIG. 6 illustrates characteristic diagrams obtained when the two recording layers of a magneto-optic recording medium according to the present invention is A type and does not have a compensation temperature between room temperature and the Curie temperature:

FIG. 7 illustrates characteristic diagrams obtained when the recording layer of a magneto-optic recording medium according to the present invention is P type of which a first recording layer has a compensation temperature between room temperature and the Curie temperature:

FIG. 7C schematically illustrates the transformation of the state of magnetization in accordance with a temperature change;

FIG. 8 illustrates an information reproducing method for use in one form of a magneto-optic recording medium of the present invention:

FIG. 9 illustrates characteristics of a magneto-optic recording medium of the present invention:

FIG. 13 schematically illustrates the construction of the layers of the recording media used in Examples of the present invention:

DETAILED DESCRIPTION OF THE PREFERRED EMBODIMENTS

A detailed description will now be given with reference to the drawings of a magneto-optic recording medium and an information reproducing method using the recording medium according to the present invention.

Figure 1A:
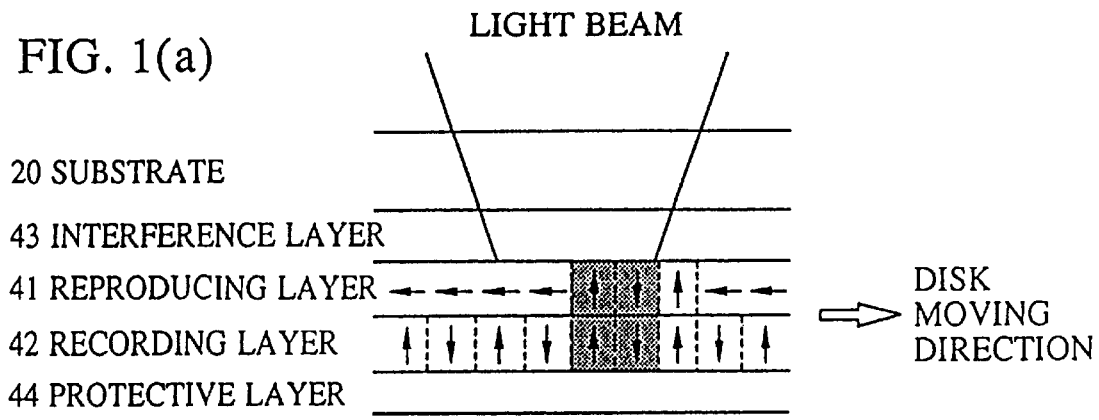
FIG. 1A illustrates the orientations of magnetization of the respective layers.
Figure 1B:
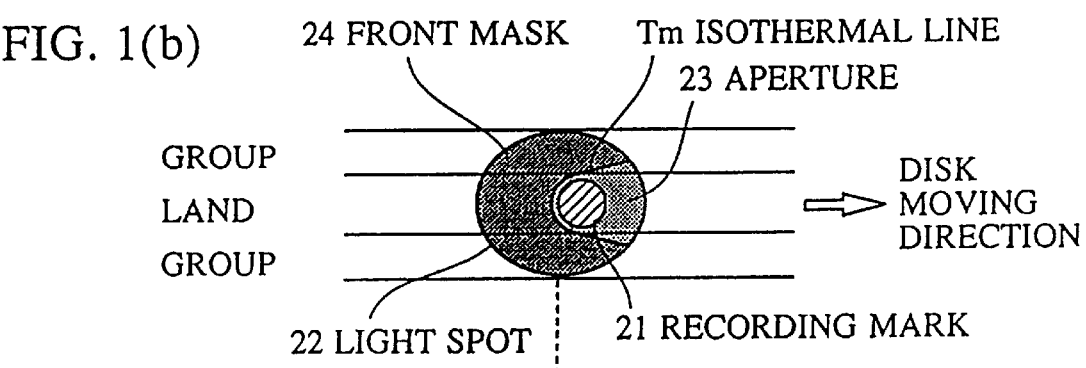
FIG. 1B illustrates a mask region and an aperture region placed within a light spot on the upper surface of a recording medium.
Figure 1C:
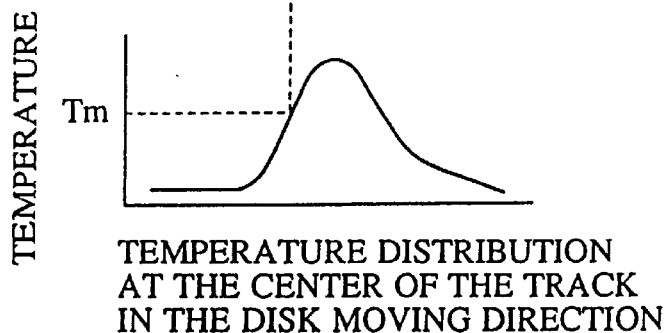
FIG. 1C illustrates the temperature distribution at the center of the track of the medium.
Figure 3B:
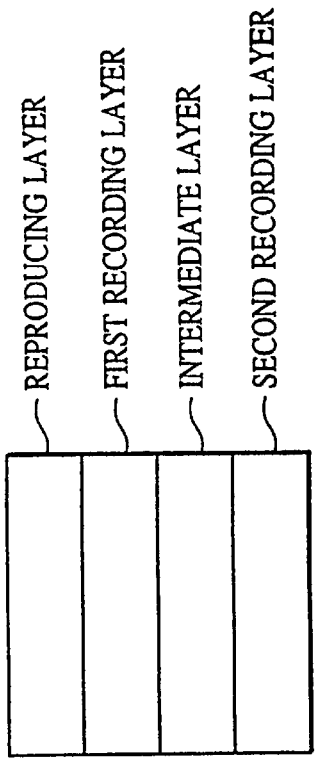
FIG. 3B illustrates the construction of the layers including an intermediate layer between the two recording layers.

The respective magnetic layers of the magneto-optic recording medium of the present invention comprise a recording layer and a reproducing layer. The reproducing layer is formed of a single layer, i.e., a first magnetic layer, while the recording layer is formed of double layers, i.e., second and third magnetic layers. Among the two layers, the layer adjacent to incident light will hereinafter be referred to as a first recording layer, while the other layer will be referred to as a second recording layer, and "the recording layer" shall mean these two layers. The magneto-optic recording medium of the present invention is basically constructed by stacking the reproducing layer, the first recording layer and the second recording layer, as shown in FIG. 3A. It should be noted that the respective magnetic layers are stacked on a transparent substrate, though not shown in FIG. 3.

The characteristics of the respective magnetic layers will first be explained.

(Reproducing layer)

Figure 14:
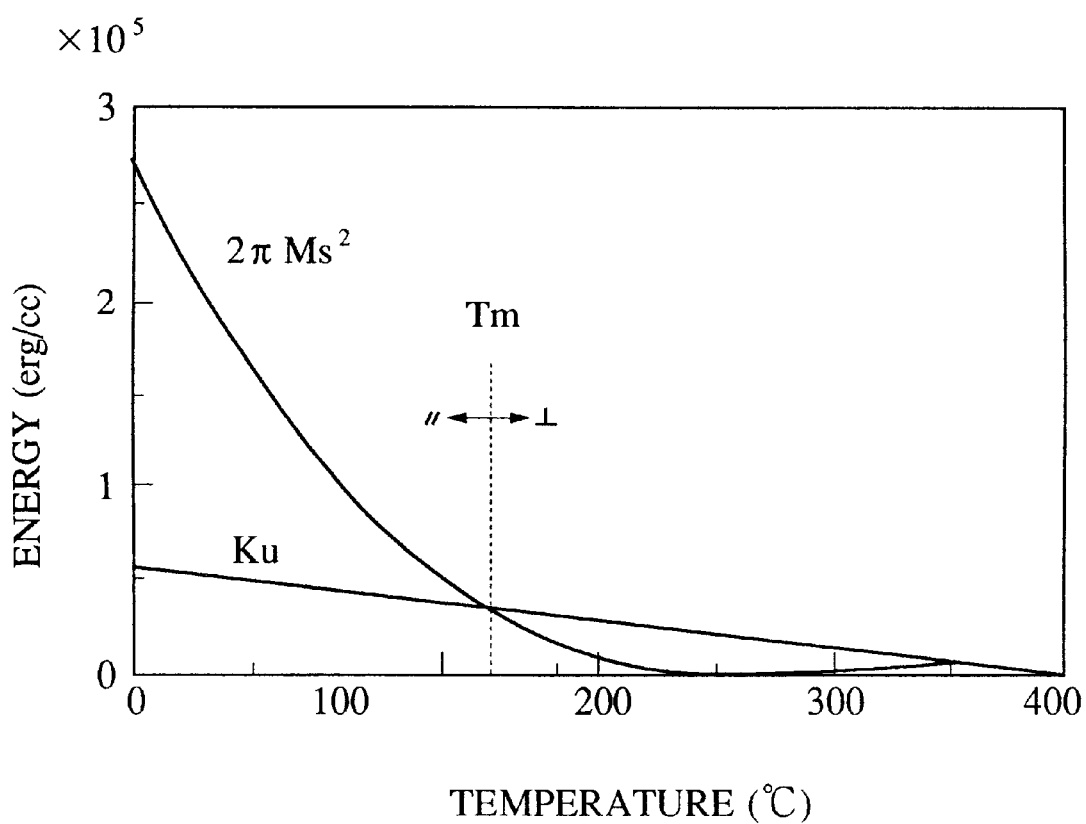
FIG. 14 shows the temperature dependency of demagnetization energy $2\pi Ms^2$ and the perpendicular magnetic anisotropic constant Ku of the reproducing layer of a magneto-optic recording medium according to the present invention.

A magnetic film used for the reproducing layer of the magneto-optic recording medium of the present invention is a film of the type which remains in the form of an in-plane magnetic film at room temperature and is transformed into the state of a perpendicular magnetic film at high temperatures. An example of the magnetic film will be given below. It is known that the major orientation of magnetization of a single-layer magnetic film is generally determined by the effective perpendicular magnetic anisotropy constant K defined by the following equation:

$$K=Ku-2\pi Ms^2$$

where Ms indicates magnetic saturation; Ku represents perpendicular magnetic anisotropy energy; and $2\pi Ms^2$ denotes demagnetization energy. When the constant K is positive, the magnetic film is in the state of a perpendicular magnetic film. On the other hand, when the constant K is negative, the magnetic film is in the state of an in-plane magnetic film. Accordingly, the following type of a magnetic film is effective for transforming from an in-plane magnetic film to a perpendicular magnetic film: a magnetic film provided with a reproducing layer wherein the relationship between the perpendicular magnetic anisotropy energy Ku and the demagnetization energy $2\pi Ms^2$ varies in relation to the temperature, as illustrated in FIG. 14.

When the temperature, at which the perpendicular magnetic anisotropy energy Ku and the demagnetization energy $2\pi Ms^2$ coincides with each other, is indicated by Tm, the following formulas hold true, and thus, the resulting reproducing layer remains in the state of an in-plane magnetic film in a region at temperatures lower than Tm:

$Ku < 2\pi Ms^2$, $K < 0$ (T<Tm)

As the temperature T of the recording medium increases, the magnetic saturation Ms reduces, which further abruptly decreases the demagnetization energy $2\pi Ms^2$. This reverses the quantitative relationship between the demagnetization energy $2\pi Ms^2$ and the perpendicular magnetic anisotropy energy Ku expressed by the formulas shown above. As a result, the relationship between the demagnetization energy $2\pi Ms^2$ and the perpendicular magnetic anisotropy energy Ku can be expressed by the following formulas, and the reproducing layer is transformed into the state of a perpendicular magnetic film.

$Ku > 2\pi Ms^2$, $K > 0$ (Tm<T)

The reproducing layer, serving to reproduce magnetic information stored in the recording layer, is placed more adjacent to the incident light than the recording layer is, and the Curie temperature of the reproducing layer is set higher than that of the recording layer in order not to decrease the Kerr rotation angle during reproduction. Also, it is required that the coercive force of the reproducing layer be smaller than that of the recording layer. This is because that the state of the reproducing layer should be transformed from an in-plane magnetic film to a perpendicular magnetic film, while the recording layer should remain as a perpendicular magnetic layer and maintain recorded information stably therein.

Materials for the reproducing layer include, preferably but not exclusively, rare earth element-iron group amorphous alloys, for example, GdFeCo, GdTbFeCo, GdDyFeCo, NdGdFeCo, and DyFeCo. Among others, a material essentially consisting of GdFeCo is more preferable because it is high in the Curie temperature and low in the coercive force.

It is necessary that the thickness of the reproducing layer be reduced to such a degree that the reproducing layer can transmit incident light and that the Kerr rotation angle $\theta_k$ can be canceled in the recording layer. However, the reproducing layer having a thickness of less than 50 Å does not generate satisfactory reproducing signals. On the other hand, the reproducing layer having a thickness in excess of 300 Å impairs the advantages of the present invention. Thus, the suitable thickness of the reproducing layer is preferably in a range of from 50 Å to 300 Å, and more preferably, in a range of from 80 Å to 200 Å.

(Recording layer)

Materials which can provide the following characteristics to the first and second recording layers for storing information therein are preferably used. The recording layer can remain in the state of a perpendicular magnetic film in a temperature range of from room temperature to the Curie temperature, in other words, the recording layer can conspicuously exhibit perpendicular magnetic anisotropic characteristics so as to stably maintain its magnetizing state. More specifically, the following materials are, preferably, but not exclusively, used: rare earth element-iron group amorphous alloys, such as TbFeCo, DyFeCo, TbDyFeCo; garnet; platinum group-iron group periodic structure films, such as Pt/Co; Pd/Co platinum group-iron group alloys, such as PtCo, PdCo, and the like.

It is necessary that the light passing through the reproducing layer further pass through the first recording layer and reach the second recording layer. This entails that the first recording layer should be thin enough to transmit light. However, recorded information cannot be stably stored in an excessively thin film. It is not essential to form the second recording layer thin enough to transmit the incident light, because the advantages of the present invention can be expected even if the incident light is reflected on the surface of the second recording layer. All the same, the second recording layer is desirably formed thin enough to transmit the incident light in response to the following enhanced structure of the recording medium and to considerably improve the quality of signals. That is, a reflective layer may further be disposed on a surface opposite to the surface of the second recording layer to be illuminated with the incident light. Thus, the thickness of the first and second recording layers is preferably 20 Å or greater but less than 300 Å, and more preferably, the thickness of the first recording layer is in a range of from 20 Å to 100 Å, while the thickness of the second recording layer is in a range of from 30 Å to 150 Å.

The thickness of the recording layer should be determined so that the rotation angle $\theta_2$ of the plane of polarization of the incident light in the second recording layer be greater than the rotation angle $\theta_1$ of the plane of polarization of the incident light in the first recording layer. The thickness should also be determined so that the disparity $(\theta_2 - \theta_1)$ be substantially equal to the rotation angle $\theta_R$ of the plane of polarization of the incident light in the reproducing layer. For meeting these requirements, the first recording layer is required to be formed thinner than the second recording layer when both layers have a substantially similar degree of complex index of refraction, because the first recording layer located more adjacent to the incident light than the second recording layer produces a greater influence on the rotation angle of the plane of polarization.

The following two types of compositions are possible when a ferrimagnetic earth element (RE)-iron group transition metal (TM) alloy is used for the recording layer. One type of composition can be considered when the recording layer is formed by stacking the following two types of layers: a first type of magnetic layer in which a rare earth element is dominant over iron group transition metal at room temperature, without having a compensation temperature between room temperature and the Curie temperature, and a second type of magnetic layer in which iron-group transition metal is dominant over a rare earth element at room temperature, without having a compensation temperature between room temperature and the Curie temperature (this recording layer will hereinafter be referred to as A type). The other type of composition can be considered when the recording layer is formed by stacking the following two types of layers: a third type of magnetic layer in which a rare earth element is dominant over iron-group transition metal at room temperature, having a compensation temperature between room temperature and the Curie temperature, and a fourth type of magnetic layer in which a rare earth element is dominant over iron-group transition metal at room temperature, without having a compensation temperature between room temperature and the Curie temperature (this recording layer will hereinafter be referred to as P type).

It should be noted that "a rare earth element is dominant (RE rich)" means that the sub-lattice magnetic moment of the rare earth element is greater than the magnetic moment of the iron-group transition metal. On the other hand, "transition metal is dominant (TM rich)" means that the sub-lattice magnetic moment of the iron-group transition metal is greater than the magnetic moment of the rare earth element.

Whether the A type or the P type is employed for the recording layer, it is preferable that the Curie temperatures of the first and second recording layers be substantially equal to each other, though not essential. It is necessary that the sub-lattice magnetic moment of the first magnetic layer and that of the second magnetic layer be oriented in the directions opposite to each other. For meeting this requirement, the effective magnetic field generated by a magnetic coupling force between the first and second magnetic layers should be greater than the coercive forces of the respective layers. In other words, the following formulas should hold true in the state in which the recording layer has recorded information stored therein without applying an external magnetic field. Namely, when Ms1 indicates the magnetic saturation of the first magnetic layer; h1 designates the thickness of the first recording layer; Hw1 denotes the effective magnetic field generated by a magnetic coupling force applied to the first recording layer; Hc1 designates the coercive force of the first recording layer; Hw2 represents the effective magnetic field generated by a magnetic coupling force applied to the second recording layer; Ms2 denotes the magnetic saturation of the second recording layer; h2 indicates the thickness of the second recording layer; and Hc2 designates the coercive force of the second recording layer, the following formulas hold true without applying an external magnetic field:

$$Hw1 < Hc1 \quad (1)$$

$$Hw2 < Hc2 \quad (2)$$

The generation of the Hw1 and Hw2 by the action of exchange interaction can be expressed by the following formula:

$$Hw1 = \frac{\sigma w12}{2Ms1h1} \quad (3)$$

$$Hw2 = \frac{\sigma w12}{2Ms2h2} \quad (4)$$

wherein σw12 indicates the interfacial magnetic domain energy between the first recording layer and the second recording layer. When a separating layer is inserted between the two layers, σw12 indicates the interfacial magnetic domain energy across the separating layer.

The magnetic domain wall energy $\sigma w M_1 M_2$ generated between the first and second magnetic layers having a high level of perpendicular magnetic anisotropic characteristics, such as TbFeCo, inconveniently exhibits as large of a value as a value in a range from 3 to 4 erg/cm². This entails that the thickness of the layers be increased.

This possible disadvantage can be avoided by interposing between the first and second magnetic layers an intermediate layer (separating layer), such as a magnetic layer having a low level of perpendicular magnetic anisotropic characteristics or a magnetic layer having a high level of in-plane magnetic anisotropic characteristics in which the in-plane magnetic components are greater than the perpendicular magnetic components relative to the surface of the substrate. Alternatively, a dielectric layer or a non-magnetic metal layer may intervene between the first and second recording layers. This can decrease or separate an exchange-interaction coupling force between the first and second recording layers. FIG. 3B illustrates an example of the construction of the magnetic recording medium having an intermediate layer between the first and second recording layers. For example, a magnetic layer having a low level of perpendicular magnetic anisotropic characteristics, such as GdFeCo, is used as the intermediate layer to reduce the interfacial magnetic domain wall energy to as low as 1 to 2 erg/cm².

To further separate the coupling force between the first and second recording layers, dielectric substances, such as SiN, AlNx, AlOx, TaOx, SiOx, and so on, may be used as the intermediate layer. The intermediate layer formed of one of the above-mentioned dielectric substances and having a thickness of from 10 to 20 Å can be used to substantially separate the coupling force between the two layers. Since the exchange interaction is not necessarily generated between the first and second recording layers, the above-mentioned dielectric substances are preferably used for the separating layer.

Figure 3D:
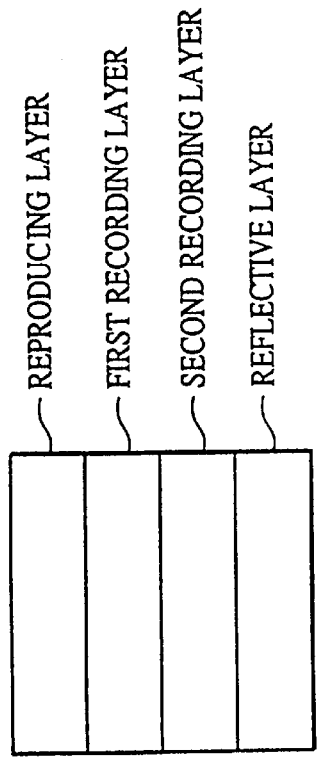
FIG. 3D illustrates the construction of the layers having a reflective layer in addition to the basic construction shown in FIG. 3A.
Figure 3A:
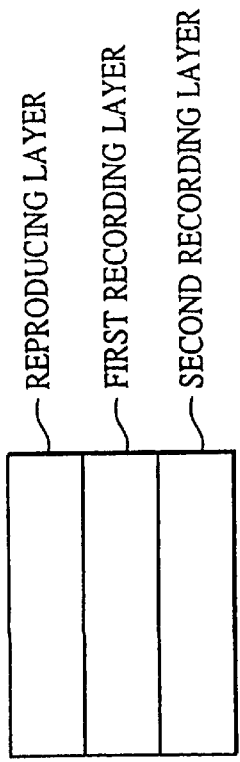
FIG. 3A illustrates the basic construction.
Figure 3C:
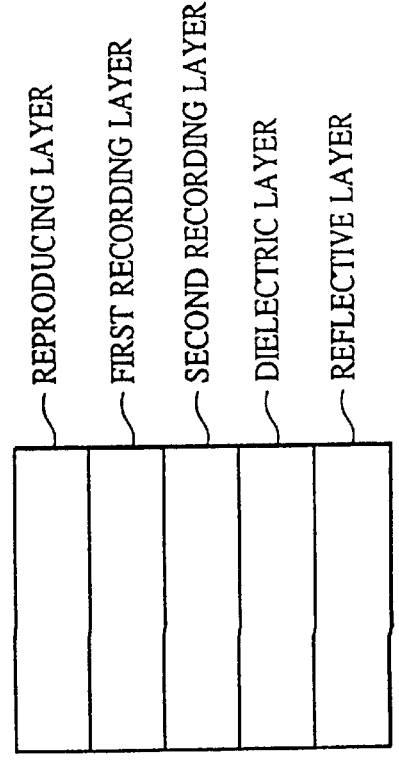
FIG. 3C illustrates the construction of the layers having a dielectric layer and a reflective layer in addition to the basic construction shown in FIG. 3A.

If the recording layer is constructed to transmit the incident light, as shown in FIG. 3D, a reflective layer may be disposed on a surface opposite the surface of the recording layer to be illuminated with the incident light. By virtue of this reflective layer, the incident light can be reflected on the reflecting layer so as to inhibit a decrease in the quantity of returning light. Further, the incident light can be enhanced between the magnetic layer and the reflective layer. Or, as illustrated in FIG. 3C, in addition to the reflective layer, a dielectric layer formed of dielectric substances, such as SiN, AlNx, AlOx, TaOx, SiOx, etc., may also be disposed as an interference layer in order to improve the effect of interference. The thickness of this interference layer should be determined so that the Kerr rotation angle $\theta_k$ in the recording layer can be canceled and that a desired value of reflectivity can be obtained. Or, a heat conductive layer may be disposed to increase heat conductivity with a view to improving the configuration of magnetic domains when information is overwritten by way of the magnetic-field modulation. These reflective layer and the heat conductive layer may be formed of Al, AlTa, AlTi, AlCr, Cu, and so on. The reflective layer should be thin to such a degree as to reflect light sufficiently. The reflective layer and the heat conductive layer should be thin so as not to require a large amount of optical power. The heat conductive layer and the reflective layer may be integrated into a single layer. Both the intermediate layer and the reflective layer may certainly be disposed, or the interference layer may also be added to these two layers.

Elements, such as Al, Ti, Pt, Nb, Cr and so on, may be added to the reproducing layer and the recording layer so as to improve their corrosion resistance. In addition to the reproducing layer and the recording layer, a dielectric layer formed of, for example, SiNx, AlOx, TaOx, SiOx, or the like, may be disposed to enhance the interference effect and protective properties. Further, a good heat-conductive layer formed of, for example, Al, AlTa, AlTi, AlCr, Cu, or the like, may be provided to improve heat conductivity. Additionally, an initialization layer in which the magnetization is unidirectionally oriented for overwriting information by means of optical modulation may be disposed, and an auxiliary layer used for assisting recording and reproducing may be arranged to make adjustments to an exchange-interaction coupling force and to a magneto-static coupling force. Further, a protective coating formed of the foregoing dielectric layer or a polymer resin may be disposed as a protective film.

A description will now be given of a method of recording information onto the magneto-optic recording medium described above.

Figure 6A:
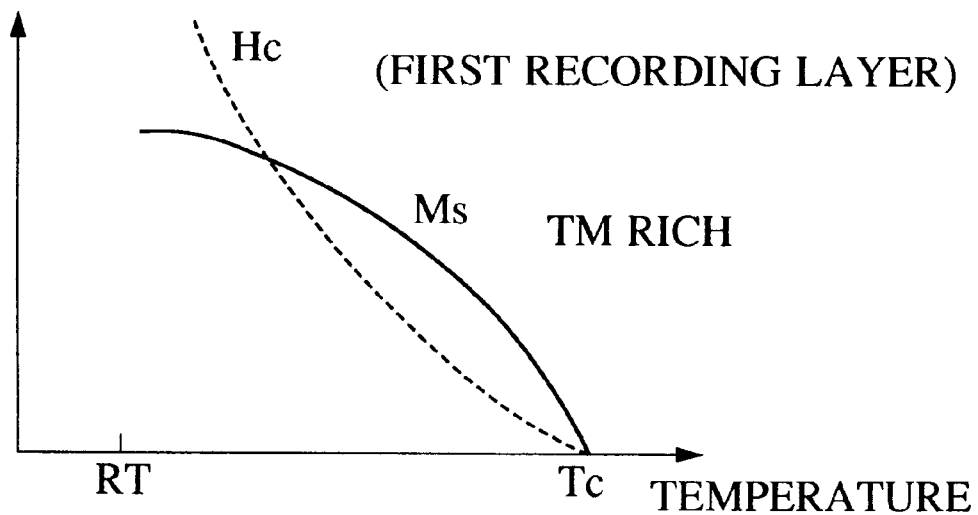
FIG. 6A shows the temperature dependency of the magnetic saturation Ms and the coercive force Hc of the first recording layer.
Figure 6B:
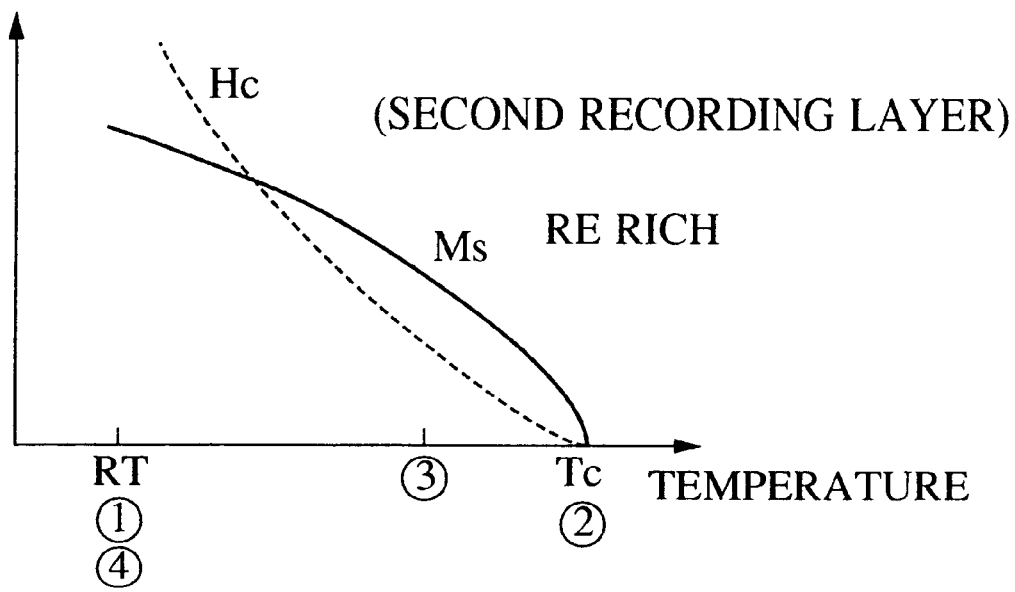
FIG. 6B shows the temperature dependency of the magnetic saturation Ms and the coercive force Hc of the second recording layer.
Figure 6C:
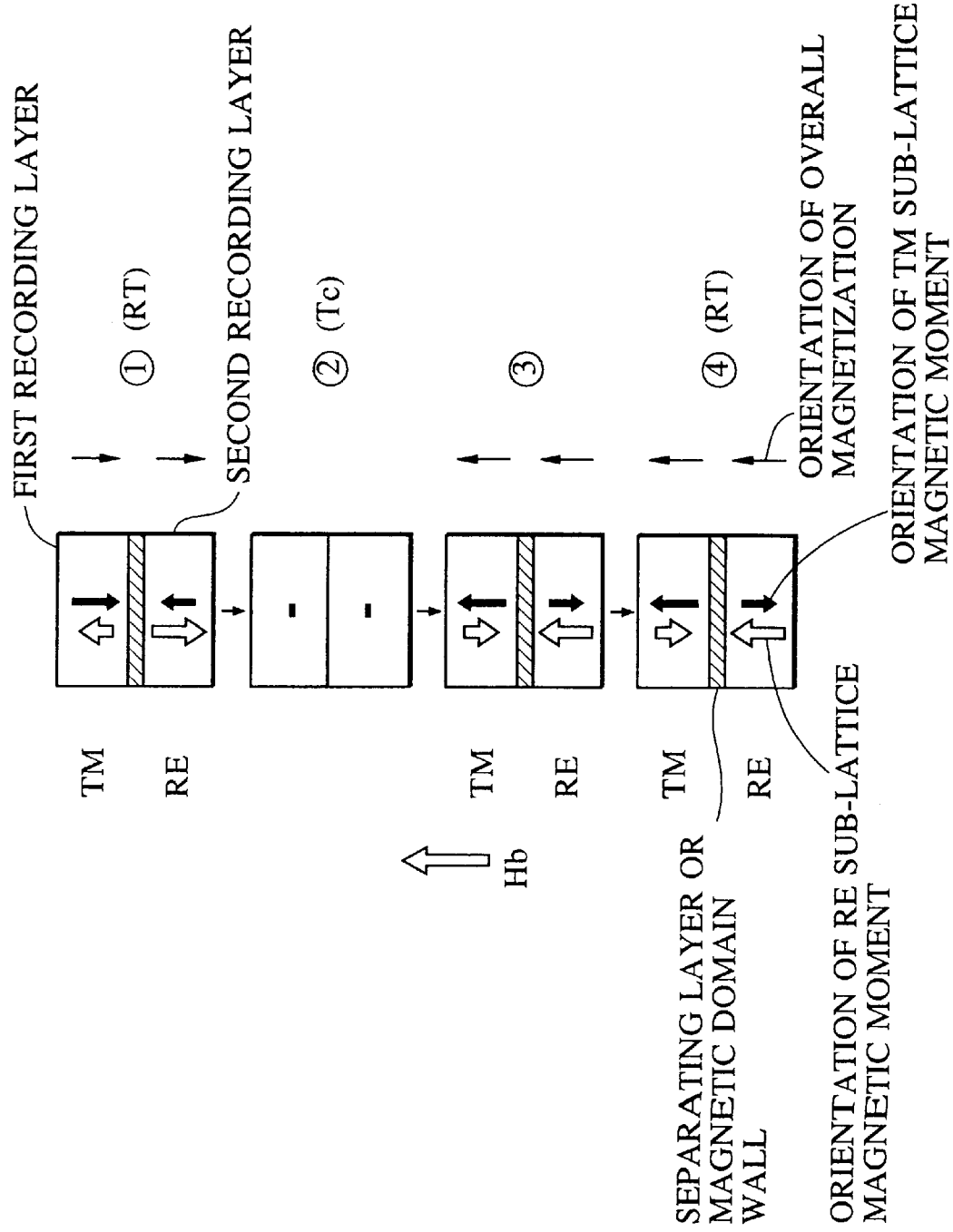
FIG. 6C schematically illustrates the transformation of the state of magnetization in accordance with a temperature change.

An explanation will first be given of the A type of the recording layer. As shown in an example of magnetic saturation Ms and coercive force Hc indicated in FIGS. 6A and 6B, and as shown in an example of the magnetizing states of the recording layer indicated in FIG. 6C, the temperature of the recording layer is raised from room temperature, at which the sub-lattice magnetic moments of the same type of elements are oriented opposite to each other in the first and second recording layers (1), to reach nearly the Curie temperature (Tc) (2). Then, an external magnetic field Hb is applied (or has been applied) to the first and second recording layers to reverse the orientations of magnetization (3). Subsequently, the recording layer is cooled to room temperature and stabilized in the state in which the sub-lattice magnetic moments of the first and second recording layers are reversed from the state illustrated in (1). When the first and second magnetic recording layers are magnetically bound to each other, in order to avoid the re-reversal of the magnetic moments, it is necessary that the effective external magnetic field generated by a magnetic coupling force not be greater than the reversed magnetic field (coercive force) in the process of the transformation of the layers from the state (3) to the state (4). In the above-described A type of the recording layer, the first recording layer is rich in the transition metal (TM) at room temperature, while the second recording layer is rich in the rare earth element (RE) at room temperature. However, this may be simply reversed.

Figure 7A:
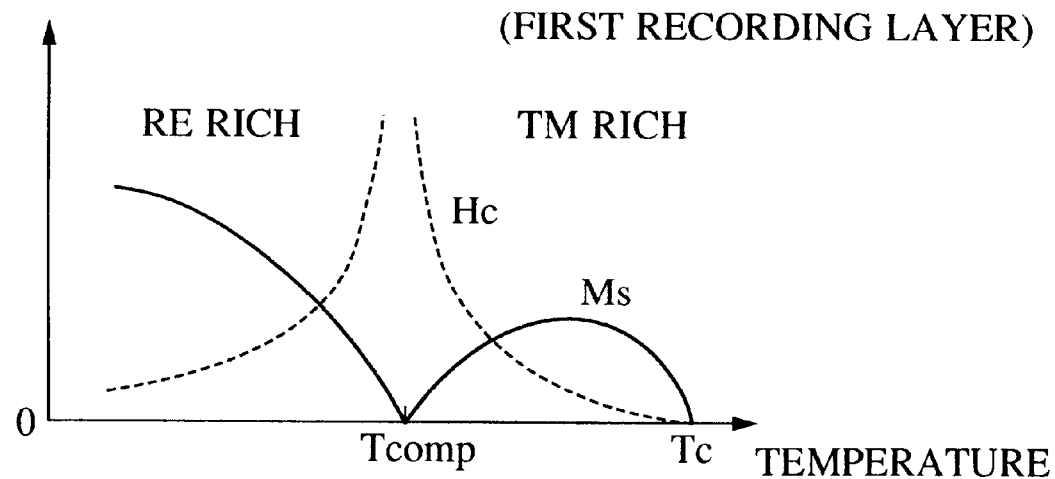
FIG. 7A is a diagram showing the temperature dependency of the magnetic saturation Ms and the coercive force Hc of the first recording layer.
Figure 7B:
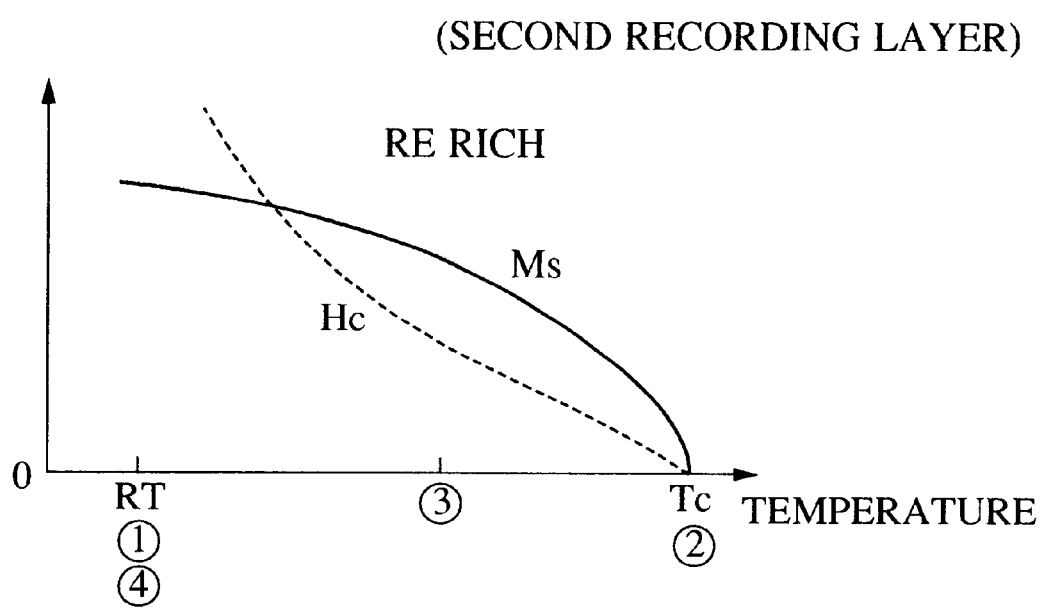
FIG. 7B is a diagram showing the temperature dependency of the magnetic saturation Ms and the coercive force Hc of the second recording layer.

In contrast, in the P type of the recording layer, as shown in an example of magnetic saturation Ms and coercive force Hc indicated in FIGS. 7A and 7B, and as shown in an example of the magnetization state of the recording layer indicated in FIG. 7C, the temperature of the recording layer is raised from room temperature (RT), at which the sub-lattice magnetic moments are oriented opposite to each other in the first and second magnetic layers (1), to nearly reach the Curie temperature (2). Then, an external magnetic field is applied (or, has been applied) to the first and second layers to reverse the orientations of magnetization (3). Subsequently, the recording layers, passing through the compensation temperature (Tcomp) in the process of cooling to reach room temperature, are stabilized in the state in which the sub-lattice magnetic moments are reversed from the state illustrated in (1) and the orientation of the overall magnetization is not parallel to the orientation illustrated in (1) (4). In order to avoid the re-reversal of the magnetic moments, it is necessary that the effective external magnetic field generated by a magnetic coupling force not be greater than the reversed magnetic field (coercive force) in the process from the state (3) to the state (4). In the above-described P type of the recording layer, the first recording layer is rich in the rare earth element (RE) at room temperature and has a compensation temperature between room temperature and the Curie temperature, while the second recording layer is rich in the rare earth element (RE) at room temperature and does not have a compensation temperature between room temperature and the Curie temperature. However, this may be simply reversed. In the P type of recording layer, as shown in FIG. 7, the orientations of magnetization are reversed in the first and second recording layers, which makes it possible to decrease the magnitude of magnetization of the overall recording layer. This may further decrease adverse influences caused by a leakage of a magnetic field from a peripheral recording layer during recording (for example, noise may be caused by the disorder of the configuration of recording magnetic domains).

The above-described method can be employed to both A and P types of recording layers when information is recorded by reversing the orientations of magnetic moments. However, the same method is also applicable for recording information by maintaining the magnetic moments in the same direction as they have been before recording, except that an external magnetic field is applied to the recording layer in the opposite direction.

Recording may be performed, for example, by modulating laser power while applying an external magnetic field in the recording direction after old data has been erased. Alternatively, old data is overwritten by new data by means of modulating laser power while applying an external magnetic field. This overwriting recording is performed in the following manner. The intensity of a laser beam should be determined in consideration of the linear velocity of the recording medium so that only a predetermined region within a light spot can reach at and around the Curie temperature of the recording layer. Upon this determination, recording magnetic domains of a size smaller than the light spot can be formed. As a result, signals having a period less than the diffraction limited can be recorded. Alternatively, overwriting recording can be performed by modulating an external magnetic field while applying a laser beam having power which will enable the recording layer to reach the Curie temperature or higher. In this case, the modulation velocity is increased in accordance with the linear velocity of the recording medium so that recording magnetic domains of a size smaller than the optical spot can be formed. As a consequence, signals having a period less than the diffraction limited can be recorded.

A description will be given further of a method of reproducing information from the magneto-optic recording medium of the present invention.

In this invention, part of a region within a light spot is optically masked with an in-plane magnetic film without applying an external magnetic field, thereby realizing magnetic super-resolution.

Figure 8A:
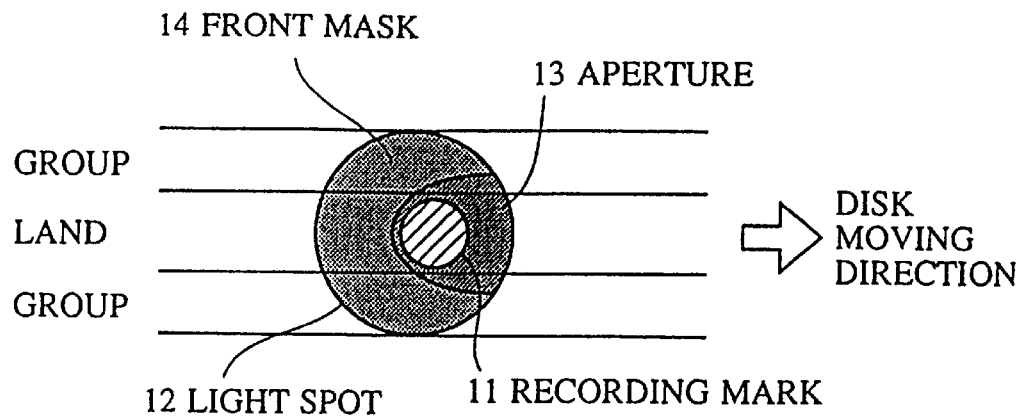
FIG. 8A illustrates a mask region and an aperture region placed within a light spot on the upper surface of a recording medium.
Figure 8B:
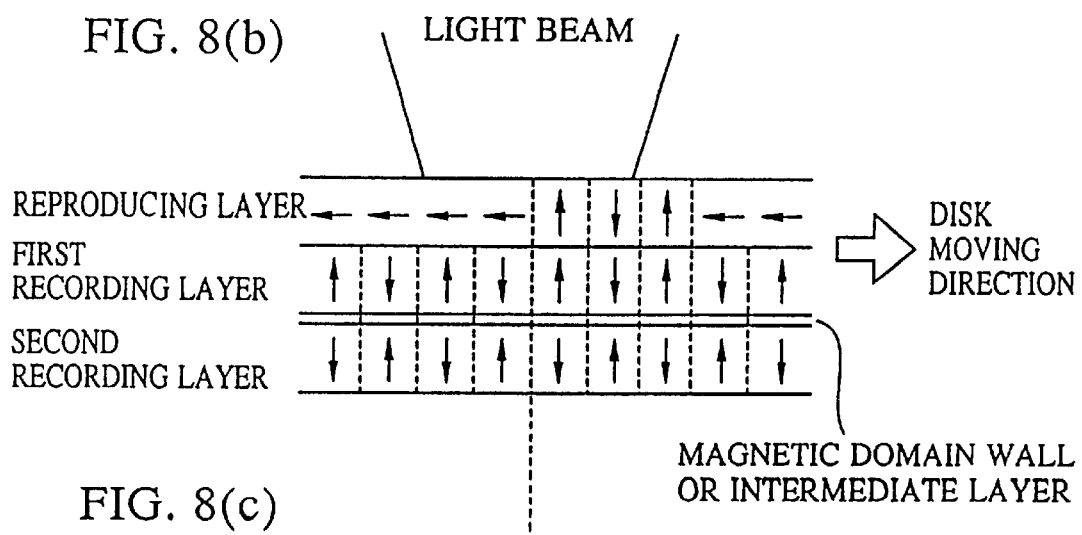
FIG. 8B illustrates the orientations of magnetization of the respective layers.
Figure 8C:
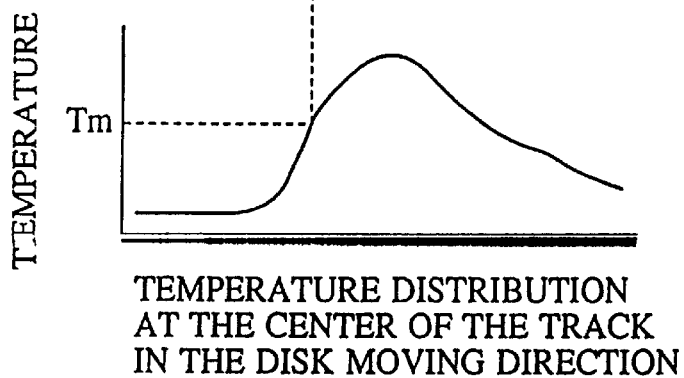
FIG. 8C illustrates the temperature distribution at the center of the track of the medium.

As shown in FIG. 8, magnetization is oriented in the planar direction in a region within a light spot of the reproducing layer at room temperature and at low temperatures (T<Tm). On the other hand, the magnetic information of the first recording layer is transferred to a region of the reproducing layer at high temperatures (T>Tm) due to an exchange-interaction coupling force. This causes the generation of two regions, i.e., an aperture region 13 in which a recording mark 11 is detected, and a mask region 14 in which the recording mark 11 is not detected, as illustrated in FIG. 8A. The information can be reproduced by detecting the magneto-optic effect of the reflected light of the light spot 12. Considering that the area of the high-temperature region within the optical spot 12 shown in FIG. 8 can be determined by the intensity of the laser beam, the magnetic information recorded in the recording layer can be transferred to the reproducing layer by the unit of a recording mark of a signal having a period less than the optical detection limited. As a result, signals having a period less than the optical detection limited can also be reproduced without causing intercode interference. Further, the temperature distribution obtained during reproduction should be determined so that the temperature Tr in a boundary between a reproducing track and an adjacent track can be greater than Tth. This can avoid the signals recorded in the recording layer of the adjacent track from being transferred to the reproducing layer, thereby solving the problem of crosstalk and improving track density. Additionally, when the heat conductivity of the medium is comparatively large, the center of the temperature profile approaches the optical spot, and accordingly, a portion adjacent to the center of the optical spot results in the aperture region. This can similarly solve the problem of crosstalk.

In the manner described above, the mask region is constituted by the reproducing layer in the form of an in-plane magnetic film, while the aperture region is formed after the reproducing layer has been raised to a higher temperature and transformed into the state of a perpendicular magnetic film, and the magnetic information stored in the recording layer has been transferred to the reproducing layer. In other words, the magnetic information stored in the recording layer cannot be adequately masked unless the mask region of the reproducing layer can remain in the form of an in-plane magnetic film to a sufficient degree.

Intrinsically, the reproducing layer, in the form of a single layer which is not stacked with another magnetic layer, is able to remain substantially in the form of an in-plane magnetic film at low temperature. However, it is difficult for the reproducing layer to completely remain in the state of an in-plane magnetic film at room temperature when it is stacked with the recording layer. This is because of the following reason. The reproducing layer, which is stacked with the recording layer forming a perpendicular magnetic film, is partially subjected to a strong exchange-interaction coupling force from the recording layer, thus inconveniently generating perpendicular magnetic components in the portion of the reproducing layer adjacent to the recording layer. As a consequence, the magnetic information recorded in the first recording layer is partially transferred to the reproducing layer. This means that the light passing through the reproducing layer has the same rotation angle of the plane of polarization as the angle of the plane polarization in the first recording layer, causing a decrease in the quality of signals.

In the magneto-optic recording medium of the present invention, as shown in FIG. 4A or 4B, the magnetic information stored in the first recording layer adjacent to the reproducing layer is partially transferred in the form of magnetic domain walls to the region of the reproducing layer at low temperature including room temperature (T<Tm). However, the transferred information can be canceled by the second recording layer having the sub-lattice magnetic moment in the direction opposite to the moment of the first recording layer.

More specifically, the sub-lattice magnetic moments in a first recording layer 2 and a second recording layer 3 are oriented in the directions opposite to each other. With this construction, after incident light 7 passes through a reproducing layer 1, the plane of polarization of the incident light is rotated in the first recording layer 2, and is then rotated in the reverse direction in the second recording layer 3 so as to return to the magneto-optical recording apparatus.

The rotation angle $\theta_2$ of the plane of polarization of the incident light which is polarized in the second recording layer 3 is set greater than the rotation angle $\theta_1$ of the plane of polarization in the first recording layer 2. With this arrangement, the plane of polarization will be rotated in the direction reverse to the direction in which it is rotated in the reproducing layer, while passing through the first and second recording layers and reflecting thereon. Accordingly, the disparity ($\theta_2-\theta_1$) between the rotation angle $\theta_2$ of the plane of polarization in the second recording layer and the rotation angle $\theta_1$ in the first recording layer is set substantially equal to the rotation angle of the plane of polarization $\theta_R$ in the reproducing layer. With this arrangement, the plane of polarization of the reflected light returned from the recording medium is not rotated, thus preventing the detection of the magnetic information stored in the recording layer.

Figure 5A:
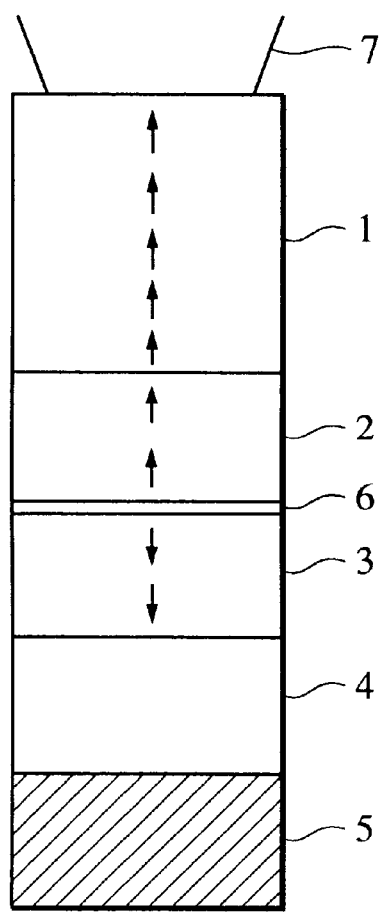
FIG. 5A illustrates a first recording layer in which magnetization is oriented in the upward direction.
Figure 5B:
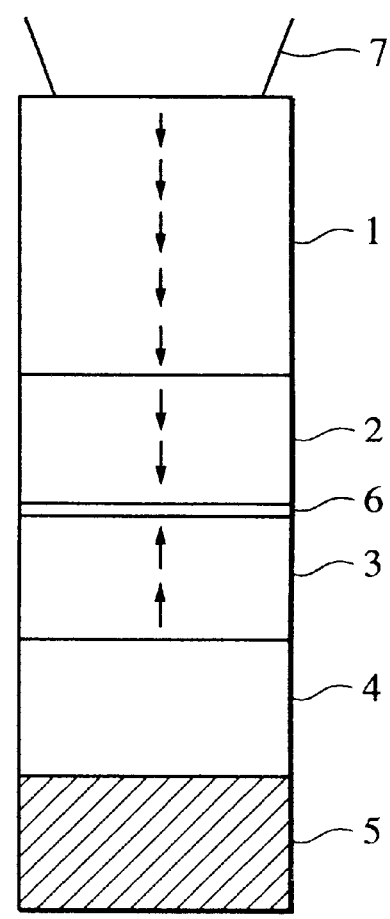
FIG. 5B illustrates a first recording layer in which magnetization is oriented in the downward direction.

As shown in FIGS. 5A and 5B, when the reproducing layer is raised to a higher temperature and is transformed into the state of a perpendicular magnetic layer, the plane of polarization is sufficiently rotated in the reproducing layer, thus achieving good quality of signals output from recording magnetic domains having a small-sized mark. FIGS. 5A and 5B illustrate the reproducing layer which has been raised to a higher temperature from the state shown in FIGS. 4A and 4B.

Although the reflective layer 5 may be directly stacked with the second recording layer 3, the following enhanced structure may be taken, instead. An interference layer 4 formed of a dielectric substance may intervene between the second recording layer 3 and the reflective layer 5, as shown in FIG. 4B, so as to increase the Kerr rotation angle $\theta_k$. Alternatively, it is possible not to dispose the reflective layer 6, in which case, the second recording layer 3 may be formed somewhat thicker so that the light can be sufficiently reflected on the second recording layer 3 and that the Kerr rotation angle may be canceled between the first and second recording layers 2 and 3.

In the magneto-optic recording medium of the present invention, it is not necessary to mask the magnetic information stored in the recording layer with the reproducing layer, which makes it possible to form the reproducing layer to be thin to such a degree as not to impair a reproducing signal. The thickness of the magnetic layers of the magneto-optic recording medium can thus be remarkably reduced compared to the conventional media.

As will be clearly understood from the foregoing description, the present invention offers the following advantages.

The respective magnetic layers including the reproducing layer of the magneto-optic recording medium are formed thinner compared to conventional media so that the recording layer can sufficiently transmit the incident light. The recording layer comprises two layers in which the sub-lattice magnetic moments are oriented in the directions opposite to each other. The rotation of the plane of polarization of the incident light at a magnetic domain wall between the reproducing layer and the recording layer is compensated at room temperature with the rotation of the plane of polarization generated in the recording layer. With this construction, it appears that the rotation of the plane of polarization is not generated in the overall recording medium, which would otherwise cause the detection of the magnetic domain information stored in the recording layer at room temperature. This further makes the mask nearly complete and improves the quality of reproduced signals, with the result that the thickness of the overall magnetic layers including the reproducing layer can be reduced.

As described above, according to the magneto-optic recording medium and the recording and reproducing method using this medium, reproducing characteristics are improved, and faster linear velocity recording can be realized, which further reduces the costs. Also, a reflective film may be disposed to enhance the construction of the recording medium, whereby the S/N (C/N) ratio can be increased.

The present invention will now be described in more detail by way of examples, but it is not limited thereto within its scope of the appended claims.

EXAMPLE 1

Magnetic films were first formed to obtain only a recording layer and other auxiliary layers, except for a reproducing layer, and then evaluated. The respective targets, such as Si, Tb, Gd, Fe, Co and Al, were attached to a DC magnetron sputtering device. A glass substrate having a diameter of 130 mm was fixed to a substrate holder installed in a position away from a distance of 150 mm from the targets. The chamber was evacuated to a high-vacuum state until the pressure would be reduced to $1\times10^{-3}$ Pa or lower by a cryopump. An Ar gas was introduced into the chamber until the pressure would be raised to 0.4 Pa while the chamber was being evacuated. Then, the following magnetic films were sequentially formed to obtain the resulting sample: a SiN dielectric layer having a thickness of 800 Å, a TbFeCo first recording layer having a thickness of 60 Å, a SiN separating layer having a thickness of 20 Å, a TbFeCo second recording layer having a thickness of 100 Å, a SiN interference layer having a thickness of 300 Å, and an Al reflective layer having a thickness of 600 Å. A $N_2$ gas, in addition to the Ar gas, was introduced to the chamber to form the respective SiN layers by means of DC reactive sputtering. The mixture ratio of the Ar gas to the $N_2$ gas was adjusted so that the refractive index would become 2.1. In the formation of TbFeCo layers, the compositions of the layers were adjusted by independently applying DC power to the respective targets, i.e., Tb, Fe and Co.

The composition of the TbFeCo first recording layer was set so that the first layer would be rich in transition metal (TM rich) at room temperature and that the Curie temperature of the first layer would become 220° C. On the other hand, the composition of the TbFeCo second recording layer was set so that the second layer would be rich in a rare earth element (RE rich) at room temperature without having a compensation temperature between room temperature and the Curie temperature and that the Curie temperature of the second layer would become 220° C.

Figure 9A:
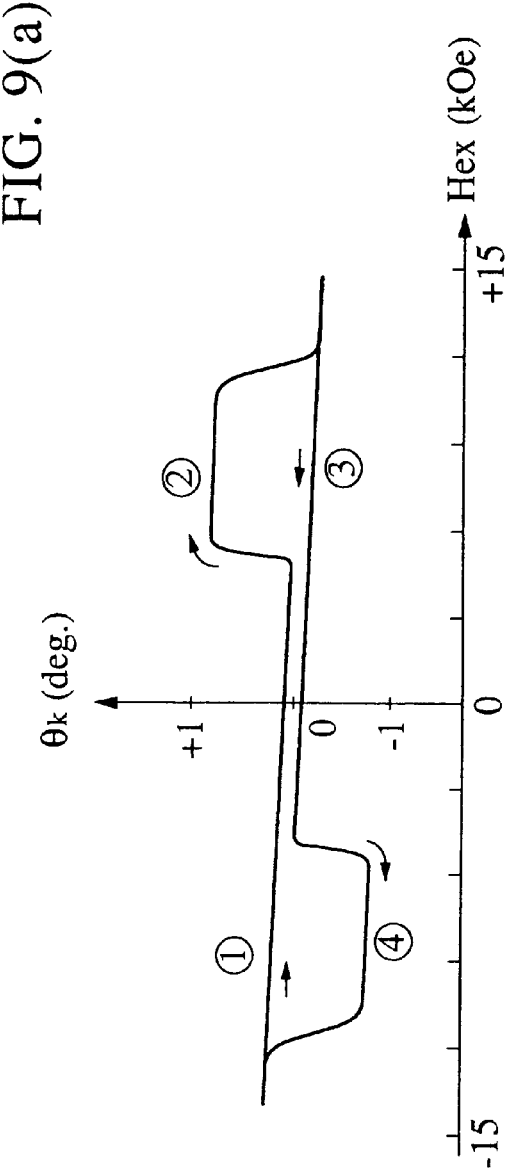
FIG. 9A shows the relationship between the Kerr rotation angle of the recording layer of the medium and the external magnetic field Hex.
Figure 9B:
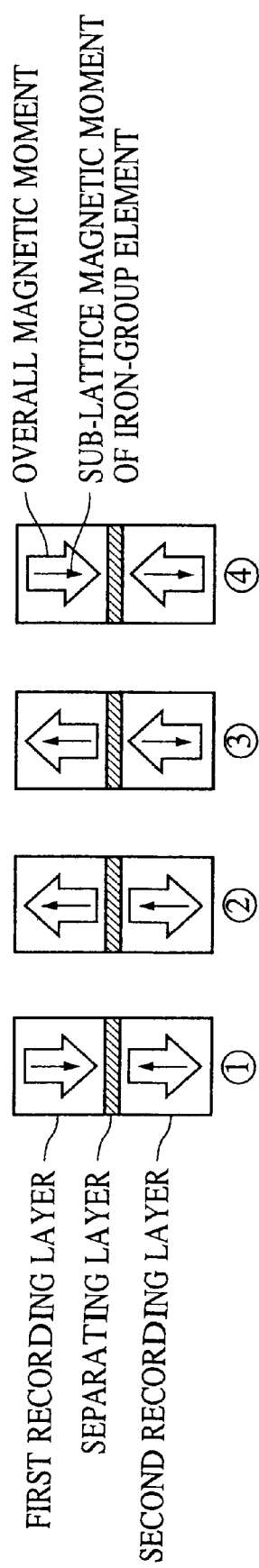
FIG. 9B illustrates the states of magnetization represented by the diagram shown in FIG. 9A.

Subsequent to the formation of the above-described sample, the dependency of the Kerr rotation angle $\theta_k$ on the magnetic field was evaluated with a device for evaluating the Kerr rotation angle. The resulting a $\theta_k$-Hex diagram at room temperature is shown in FIG. 9A. FIG. 9A indicates that there is a slight displacement between a curve of $\theta_k$ sweeping a magnetic field from the positive side of the field and a curve of $\theta_k$ sweeping a magnetic field from the negative side in a range of ±5 kOe. The magneto-optic effect at 780 nm can largely be obtained from the magnetization of an iron-group element. Accordingly, the transition of the Kerr rotation angle $\theta_k$ from the state (1) to the state (2) is caused by reversing the magnetic moment in the first recording layer, while the transition of the Kerr rotation angle $\theta_k$ from the state (2) to the state (3) results from reversing the magnetic moment in the second recording layer. It is assumed that respective states (1), (2), (3) and (4) of the Kerr rotation angle can be indicated by the magnetic states shown in FIG. 9B. FIG. 9B shows that the Kerr rotation angles $\theta_k$ of the first and second recording layers in which the sublattice magnetic moments are oriented in the directions reverse to each other are not completely canceled with each other, and instead, the rotation angle $\theta_k$ of the second magnetic layer is slightly greater than that of the first recording layer.

COMPARATIVE EXAMPLE 1

Figure 13A:
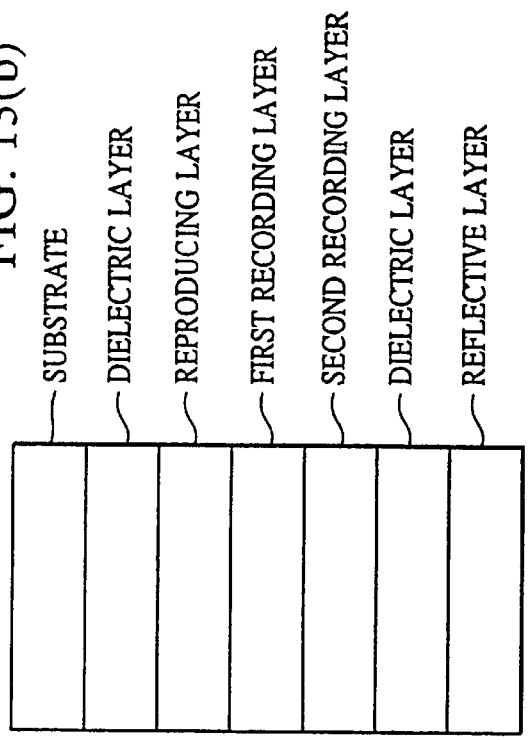
FIGS. 13A, 13B and 13C illustrates the construction of the layers corresponding to Examples 2, 3 and 4, respectively.

A recording medium of Comparative Example 1 was formed. By using a film-forming device and a method similar to those employed in Example 1, the following respective layers were sequentially formed on a polycarbonate substrate: a SiN dielectric layer having a thickness of 800 Å, a GdFeCo reproducing layer having a thickness of 400 Å, a TbFeCo recording layer having a thickness of 400 Å, and a SiN protective layer having a thickness of 700 Å. Thus, a sample constructed as shown in FIG. 13A was obtained. The coercive force of the TbFeCo recording layer was 7 kOe. The composition of the GdFeCo reproducing layer was set so that the layer would be rich in a rare earth element (RE rich) at room temperature and that the compensation temperature and the Curie temperature would become 220° C. and 300° C. or higher, respectively.

Subsequent to the formation of the sample, the dependency of the Kerr rotation angle $\theta_k$ on the magnetic field was evaluated with a device for evaluating the Kerr rotation angle $\theta_k$. The rotation angle $\theta$ was determined according to a circularly polarized light modulation method by the following process. An electric-resistance heater was placed on the film of the sample to adjust the temperature of the sample. The sample was irradiated with a semiconductor laser at 780 nm from the glass substrate, while sweeping an external magnetic field (Hex) at a maximum of 15 kOe perpendicularly to the surface of the substrate.

Figure 10:
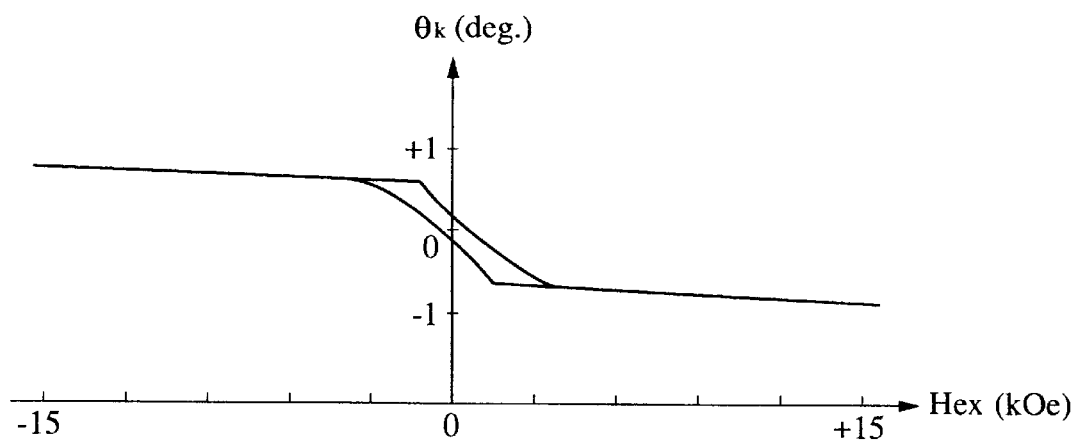
FIG. 10 shows the relationship between the Kerr rotation angle of a magneto-optic recording medium used in Comparative Example at room temperature and the external magnetic field Hex.

The resulting $\theta_k$-Hex diagram at room temperature is shown in FIG. 10. FIG. 10 indicates that the Kerr rotation angle $\theta_k$ is not zero even when a magnetic filed is not applied at all. Accordingly, magnetic information stored in the recording layer was transferred to the reproducing layer even at room temperature. Hence, it has been validated that this recording medium did not exhibit the super-resolution effect.

EXAMPLE 2

Then, the magneto-optic recording medium of the present invention was formed in such a basic manner that it was constructed without providing a separating layer and a reflective layer. An evaluation was made whether magnetic information in the reproducing layer would be canceled by the two recording layers at room temperature, which was targeted for the present invention. By using a device and method similar to those employed in Example 1, the following respective layers were sequentially formed: a SiN dielectric layer having a thickness of 800 Å, a GdFeCo reproducing layer having a thickness of 100 Å, a TbFeCo first recording layer having a thickness of 60 Å, a TbFeCo second recording layer having a thickness of 100 Å, a SiN interference layer having a thickness of 300 Å, and an Al reflective layer having a thickness of 600 Å. Thus, a sample constructed as shown in FIG. 13A was obtained.

The composition of the GdFeCo reproducing layer was set so that the layer would be rich in a rare earth element (Re rich) at room temperature and that the compensation temperature and the Curie temperature would become 220° C. and 300° C. or higher, respectively.

The composition of the TbFeCo first recording layer was set so that the layer would be rich in transition metal (TM rich) at room temperature and that the Curie temperature would become 220° C. On the other hand, the composition of the TbFeCo second recording layer was set so that the layer would be rich in a rare earth element (RE rich) at room temperature without having a compensation temperature between room temperature and the Curie temperature and that the Curie temperature would become 220° C.

Figure 11:
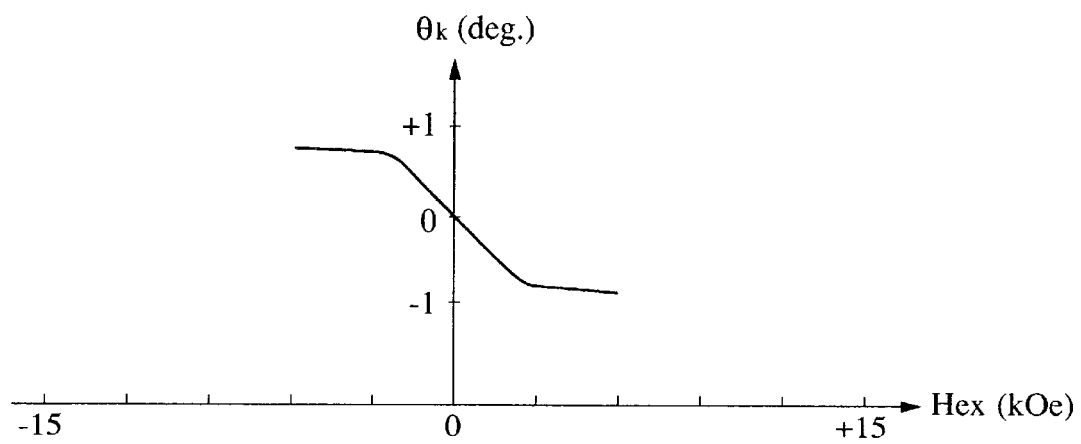
FIG. 11 shows the relationship between the Kerr rotation angle of a magneto-optic recording medium of the present invention at room temperature and the external magnetic field Hex.

Subsequent to the formation of the above-described sample, the dependency of the Kerr rotation angle $\theta_k$ on the magnetic field was evaluated with a device for evaluating the Kerr rotation angle. The resulting a $\theta_k$-Hex diagram at room temperature is shown in FIG. 11. FIG. 11 shows that a curve of $\theta_k$ sweeping a magnetic field from the positive side of the field and a curve of $\theta_k$ sweeping a magnetic field from the negative side in a range of ±5 kOe coincide with each other, and that the rotation angle $\theta_k$ becomes zero when a magnetic field is not applied at all. Hence, it has been validated that $\theta_k$ (the rotation angle of the plane of polarization) of the reproducing layer can be canceled by $\theta_k$ of the first and second recording layers in which the sublattice magnetic moments are oriented in the directions opposite to each other, which makes it possible to appear that $\theta_k$ of the overall medium is zero.

Subsequently, recording and reproducing characteristics were determined by use of this magneto-optic recording medium. Measurements were made under the following conditions to obtain the highest C/N ratio: N. A. of an objective was 0.55; a laser wavelength was 780 nm; recording power was from 7 to 13 mW; and reproducing power was from 2.5 to 3.5 mW. The linear velocity was set to be 9 m/s. After the information on the overall surface of the medium was erased, carrier signals at 5.8 MHz, 11.3 MHz and 15 MHz (corresponding to the mark size, 0.78 μm, 0.40 μm, and 0.30 μm, respectively) were recorded in the recording layer so as to examine the dependency of the C/N ratio on the mark size.

Then, measurements were made on crosstalk between a reproducing track and an adjacent track (hereinafter simply referred to as "crosstalk") by the following procedure. A signal was recorded onto a land portion so that a mark size of 0.78 μm would be obtained according to the above-described method and a carrier signal (C1) was measured. Subsequently, tracking matched an erased group portion adjacent to the land portion, and a carrier signal (C2) was similarly measured. The disparity between the two signals was expressed by (C2−C1). Since this experiment was carried out assuming that data would be recorded onto both the land and group portions, the effective track pitch was 0.8 μm. Both characteristics, such as the C/N ratio and crosstalk, were determined without applying an initializing magnetic filed and a reproducing magnetic field. The results are shown in Table 1.

Figure 12:
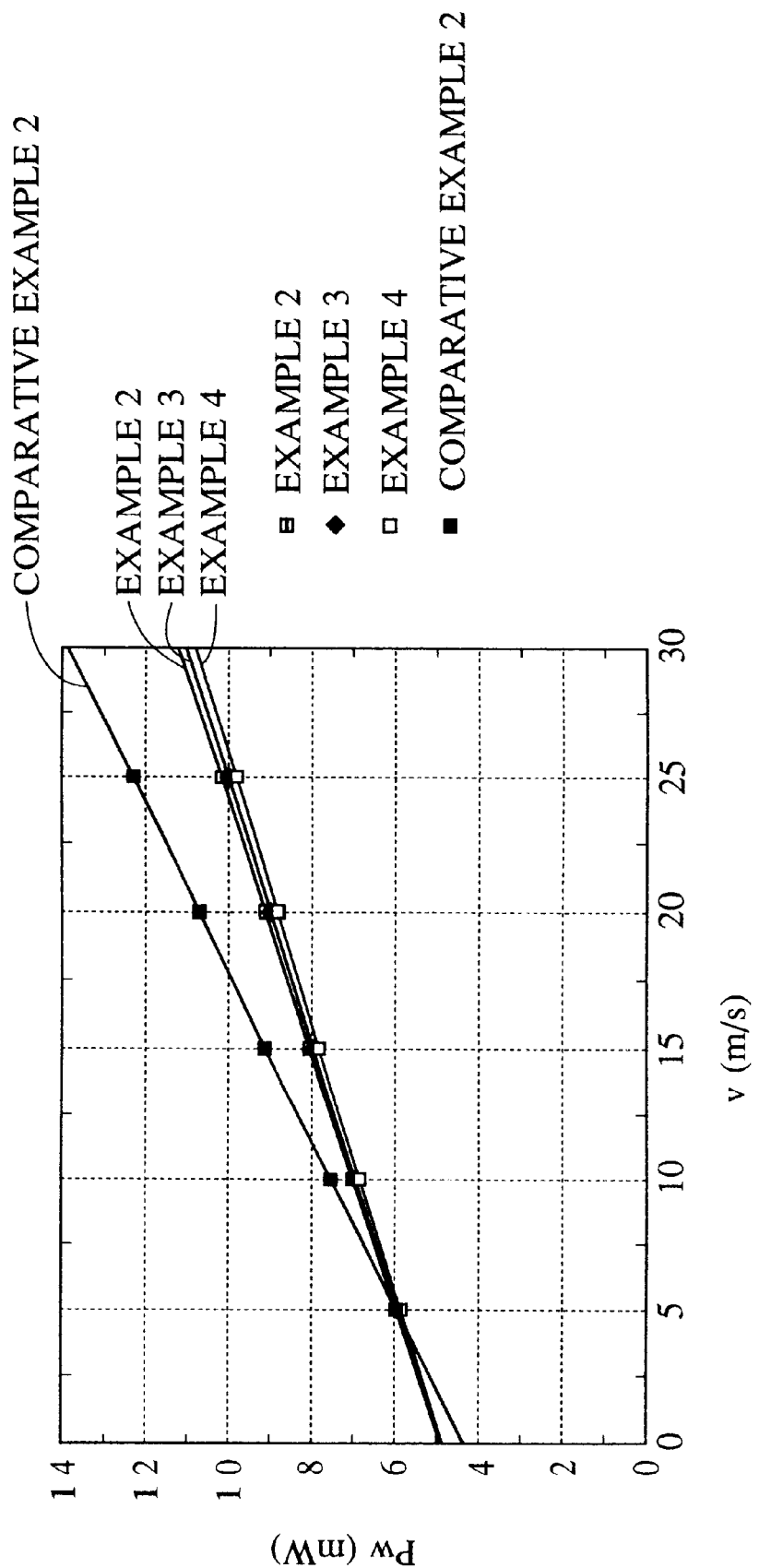
FIG. 12 shows the relationship between the recording power and the linear velocity of Examples of the present invention and Comparative Example.

Then, by varying the linear velocity in stages of 5 m/s (having a rotation velocity of 1300 rpm and a radius of 37 mm), 15 m/s (having a rotation velocity of 6300 rpm and a radius of 40 mm), 20 m/s (having a rotation velocity of 3600 rpm and a radius of 54 mm), and 25 m/s (having a rotation velocity of 3980 rpm and a radius of 60 mm), signals at 3.2 MHz, 9.6 MHz and 12.8 MHz were recorded so that the mark size would be 0.78 μm. The minimum recording power Pw to achieve a C/N ratio of 48 dB was determined. The reproducing power mW was set to be from 2.5 to 3.5 mW to achieve the maximum C/N ratio with the respective recording power. The results are shown in FIG. 12.

EXAMPLE 3

Figure 13B:
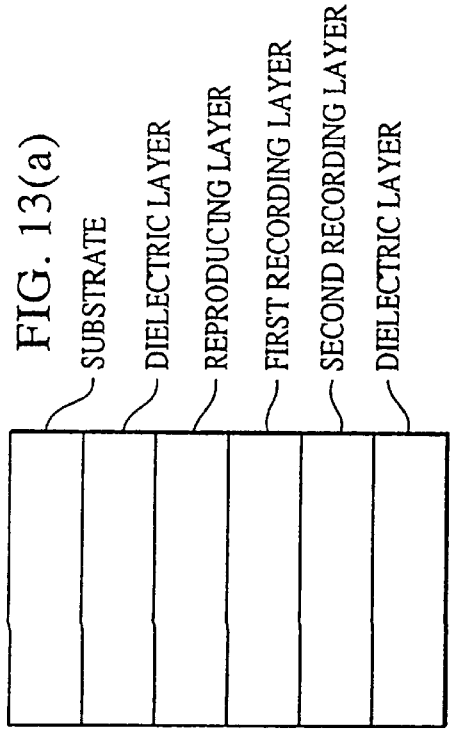

An magneto-optic recording medium provided with a reflective layer according to the present invention was formed, and then evaluated. By using a film-forming device and method similar to those employed in Example 2, the following magnetic films were sequentially formed on a polycarbonate substrate: a SiN dielectric layer having a thickness of 800 Å, a GdFeCo reproducing layer having a thickness of 120 Å, a TbFeCo first recording layer having a thickness of 56 Å, a TbFeCo second recording layer having a thickness of 100 Å, a SiN interference layer having a thickness of 300 Å, and an Al reflective layer having a thickness of 600 Å. Thus, the magneto-optic recording medium of the present invention constructed as shown in FIG. 13B was obtained.

The composition of the GdFeCo reproducing layer was set so that the layer would be rich in a rare earth element (RE rich) at room temperature and that the compensation temperature and the Curie temperature would become 220° C. and 300° C. or higher, respectively.

The composition of the TbFeCo first recording layer was set so that the layer would be rich in a rare earth element (RE rich) at room temperature and that the Curie temperature would become 250° C. and the compensation temperature would be higher than the Curie temperature. On the other hand, the composition of the TbFeCo second recording layer was set so that the layer would be rich in transition metal (TM rich) at room temperature and that the Curie temperature would become 250° C.

Then, recording and reproducing characteristics were determined by use of this recording medium, in a manner similar to Example 1. The results are shown in Table 1 and FIG. 12.

EXAMPLE 4

Figure 13C:
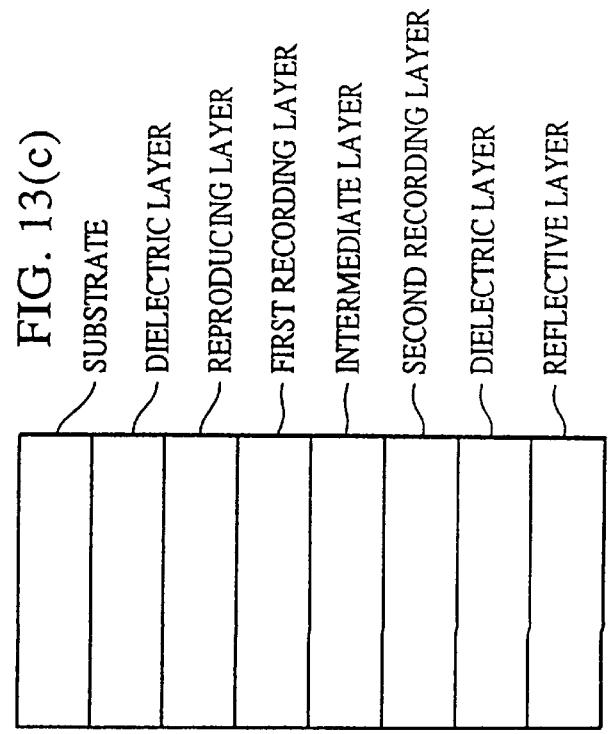

A magneto-optic recording medium provided with an intermediate layer (separating layer) and a reflective layer according to the present invention was formed, and then evaluated. By using a film-forming device and method similar to those employed in Example 2, the following magnetic films were sequentially formed on a polycarbonate substrate: a SiN dielectric layer having a thickness of 800 Å, a GdFeCo reproducing layer having a thickness of 100 Å, a TbFeCo first recording layer having a thickness of 50 Å, a SiN separating layer having a thickness of 20 Å, a TbFeCo second recording layer having a thickness of 150 Å, a SiN interference layer having a thickness of 300 Å, and an Al reflective layer having a thickness of 600 Å. Thus, the magneto-optic recording medium of the present invention constructed as shown in FIG. 13C was obtained.

The composition of the GdFeCo reproducing layer was set so that the layer would be rich in a rare earth element (RE rich) at room temperature and that the compensation temperature and the Curie temperature would become 210° C. and 300° C. or higher, respectively.

The composition of the TbFeCo first recording layer was set so that the layer would be rich in a rare earth element (RE rich) at room temperature and that the compensation temperature and the Curie temperature would become 200° C. and 250° C., respectively. On the other hand, the composition of the TbFeCo second recording layer was set so that the layer would be rich in transition metal (TM rich) at room temperature and that the Curie temperature would become 250° C.

Then, recording and reproducing characteristics were determined by use of this recording medium, in a manner similar to Example 1. The results are shown in Table 1 and FIG. 12.

COMPARATIVE EXAMPLE 2

Subsequently, recording and reproducing characteristics were determined by use of the magneto-optic recording medium of Comparative Example 1. The results are shown in Table 1 and FIG. 12.

TABLE 1

|  | C/N (dB) | | | Crosstalk (dB) |
| --- | --- | --- | --- | --- |
|  | 0.78 μm | 0.40 μm | 0.30 μm | 0.78 μm |
| Example 2 | 48 | 41 | 33 | −30 |
| Example 3 | 49 | 43 | 35 | −35 |
| Example 4 | 48 | 46 | 37 | −40 |
| Comp. Example 2 | 48 | 36 | 24 | −20 |

The following results are obtained from Table 1 and FIG. 12 in comparison of Comparative Example 2 with Examples 2, 3 and 4. The recording medium of Comparative Example 1 does not exhibit a satisfactory degree of C/N ratio with respect to a small-sized mark. In contrast, the recording media of the present invention exhibit a high degree of C/N ratio as large as 45 dB or higher with respect to a 0.4

μm-sized mark even though the thickness of the magnetic layers is thin, whereby super-resolution recording and reproducing can be realized. Additionally, FIG. 12 shows that laser power of Examples 2, 3 and 4 required for recording does not become as large as laser power of Comparative Example 2 even though the linear velocity increases. The maximum output of a semiconductor laser on the surface of the medium for use in a currently-used magneto-optic recording apparatus is approximately 10 mW. With this maximum output, the maximum linear velocity of the conventional recording medium of Comparative Example 1 is 17 m/s, while the linear velocity of the recording media of the present invention can be improved to approximately 25 m/s. It can be assumed that the disparity in the recording sensitivity between the present invention and conventional recording media will become larger if the output of a semiconductor laser is further increased. In the manner described above, the magneto-optic recording medium of the present invention can accomplish faster recording than conventional media.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magneto-optic recording medium comprising:

a transparent substrate;

a reproducing layer having a thickness of at least 50 Å and no greater than 300 Å and being an in-plane magnetized layer at room temperature and becoming a perpendicularly magnetized layer at a transition temperature higher than room temperature;

a first recording layer having a thickness of at least 20 Å and no greater than 100 Å and being perpendicularly magnetizable in a temperature range of from room temperature to the Curie temperature of said first recording layer; and a second recording layer having a thickness of at least 20 Å and no greater than 150 Å and being perpendicularly magnetizable in a temperature range of from room temperature to the Curie temperature of said second recording layer, wherein said first recording layer is thinner than said second recording layer, and said first and second recording layers each comprise an iron family element and a rare-earth element and, in each recording layer, the sub-lattice magnetic moment of the iron family element and the sub-lattice magnetic moment of the rare-earth element are oriented in opposite directions, wherein at room temperature the sub-lattice magnetic moment of the iron family element contained in said second recording layer is oriented in a direction opposite to the direction in which the sub-lattice magnetic moment of the iron family element contained in said first recording layer is oriented, wherein said layers and said substrate are disposed in the following order: said substrate, said reproducing layer, said first recording layer, and said second recording layer, wherein the composition and thickness of said reproducing layer and said first and second recording layers are such that when a reproducing beam is incident on said medium, and said reproducing layer and said first and second recording layers are between room temperature and the transition temperature of said reproducing layer, the amount of rotation of a plane of polarization of incident light passing through the second recording layer is greater than the amount of rotation of a plane of polarization of incident light passing through the first recording layer, the amount of rotation of a plane of polarization of incident light passing through said reproducing layer is not zero and is substantially equal to the difference between the (i) amount of rotation of the plane of polarization of the incident light reflected at or passing through said second recording layer and (ii) the amount of rotation of the plane of polarization of the incident light passing through said first recording layer, and wherein the plane of polarization of the incident light passing through said reproducing layer is rotated in a direction opposite to the direction in which the plane of polarization of the incident light is rotated when reflected at or passing through said second recording layer and passing through said first recording layer when said reproducing layer and said first and second recording layers are between room temperature and the transition temperature of said reproducing layer.

2. A magneto-optical recording medium according to claim 1, said reproducing layer and said first and second recording layers comprising a rare earth element-iron group alloy, wherein the sub-lattice magnetization of the iron group is greater than the sub-lattice magnetization of the rare earth element in said first recording layer, while the sub-lattice magnetization of the rare earth element is greater than the sub-lattice magnetization of the iron group in said second recording layer.

3. A magneto-optic recording medium according to claim 1, said reproducing layer and said first and second recording layers comprising a rare earth element-iron group alloy, wherein the sub-lattice magnetization of the rare earth element is greater than the sub-lattice magnetization of the iron group in said first recording layer, while the sub-lattice magnetization of the iron group is greater than the sub-lattice magnetization of the rare earth element in said second recording layer.

4. A magneto-optic recording medium according to claim 1, further comprising a metal reflective layer positioned further away from said substrate than said second recording layer.

5. A magneto-optic recording medium comprising:

a transparent substrate;

a reproducing layer having a thickness of at least 50 Å and no greater than 300 Å and being an in-plane magnetized layer at room temperature, and becoming a perpendicularly magnetized layer at a transition temperature higher than room temperature, and wherein the composition and thickness of said reproducing layer are such that the plane of polarization of incident light passing through said reproducing layer when its temperature is between room temperature and the transition temperature is rotated by an angle $\theta_R$; and a recording layer comprising:

(i) a first recording film having a thickness of at least 20 Å and no greater than 100 Å and being perpendicularly magnetizable in a temperature range of from room temperature to the Curie temperature of said first recording film, wherein the composition and thickness of said first recording film are such that the plane of polarization of incident light passing through said first recording film is rotated by a rotation angle $\theta_1$ when the temperature of said first recording film is between room temperature and the transition temperature of said reproducing layer, and (ii) a second recording film having a thickness of at least 20 Å and no greater than 150 Å and being perpendicularly magnetizable in a temperature range of from room temperature to the Curie temperature of said second recording film, wherein the composition and thickness of said second recording film are such that the plane of polarization of incident light reflected at or passing through said second recording film is rotated by a rotation angle $\theta_2$ when the temperature of said second recording film is between room temperature and the transition temperature of said reproducing layer, wherein said first recording film is thinner than said second recording film, and said first and second recording films each comprise an iron family element and a rare-earth element and, in each recording film, a sub-lattice magnetic moment of the iron family element and a sub-lattice magnetic moment of the rare-earth element are oriented in opposite directions, wherein at room temperature the sub-lattice magnetic moment of the iron family element contained in said second recording film is oriented in a direction opposite to the direction in which the sub-lattice magnetic moment of the iron family element contained in said first recording film is oriented, wherein said layers and said substrate are disposed in the following order: said substrate, said reproducing layer, said first recording film, and said second recording film, and wherein the composition and thicknesses of said reproducing layer and said first and second recording films are such that, when a reproducing beam is incident on said medium, the magnitude of $\theta_2$ is greater than $\theta_1$, the magnitude of $\theta_R$ is not zero and is substantially equal to the magnitude of $\theta_2 - \theta_1$, and wherein the direction in which the plane of polarization of incident light is rotated when passing through said reproducing layer at a temperature between room temperature and the transition temperature is opposite from the direction in which the plane of polarization of incident light is rotated when reflected at or passing through said second recording film at a temperature between room temperature and the transition temperature of said reproducing layer.

6. A magneto-optic recording medium according to claim 5, wherein the thickness of said second recording film is in the range of from 30 Å to 150 Å and the thickness of said first recording film is in the range of from 20 Å to 100 Å.

7. A magneto-optic recording medium according to claim 5, wherein the thickness of said reproducing layer is in a range of from 50 Å to 300 Å.

8. A magneto-optic recording medium according to claim 7, wherein the thickness of said reproducing layer is in a range of from 80 Å to 200 Å.

9. A magneto-optic recording medium according to claim 5, further comprising a separating layer interposed between said first recording film and said second recording film.

10. A magneto-optic recording medium according to claim 5, further comprising a reflective layer disposed on a surface of said second recording film that is furthest from said substrate.

11. A magneto-optic recording medium according to claim 5, wherein said first recording film and said second recording film each comprise a rare earth element-iron group alloy, and wherein the sub-lattice magnetization of the iron group is greater than the sub-lattice magnetization of the rare earth element in said first recording film and the sub-lattice magnetization of the rare earth element is greater than the sub-lattice magnetization of the iron group in said second recording film.

12. A magneto-optic recording medium according to claim 3, wherein said first recording film and said second recording film each comprise a rare earth element-iron group alloy, and wherein the sub-lattice magnetization of the iron group is greater than the sub-lattice magnetization of the rare earth element in said second recording film and the sub-lattice magnetization of the rare earth element is greater than the sub-lattice magnetization of the iron group in said first recording film.

13. A magneto-optic recording medium comprising:

a transparent substrate;

a reproducing layer having a thickness of at least 50 Å and no greater than 300 Å and being an in-plane magnetized layer at room temperature and becoming a perpendicularly magnetized layer at a transition temperature higher than room temperature;

a first recording layer having a thickness of at least 20 Å and no greater than 100 Å and being perpendicularly magnetizable in a temperature range of from room temperature to the Curie temperature of said first recording layer; and a second recording layer having a thickness of at least 20 Å and no greater than 150 Å and being perpendicularly magnetizable in a temperature range of from room temperature to the Curie temperature of said second recording layer, wherein said first recording layer is thinner than said second recording layer, and said first and second recording layers each comprise an iron family element and a rare-earth element and, in each recording layer, the sub-lattice magnetic moment of the iron family element and the sub-lattice magnetic moment of the rare-earth element are oriented in opposite directions, wherein at room temperature the sub-lattice magnetic moment of the iron family element contained in said second recording layer is oriented in a direction opposite to the direction in which the sub-lattice magnetic moment of the iron family element contained in said first recording layer is oriented, wherein said layers and said substrate are disposed in the following order: said substrate, said reproducing layer, said first recording layer, and said second recording layer, wherein the composition and thickness of said reproducing layer and said first and second recording layers are such that when a reproducing beam is incident on said medium, and said reproducing layer and said first and second recording layers are between room temperature and the transition temperature of said reproducing layer, the amount of rotation of a plane of polarization of incident light passing through said reproducing layer is not zero and is essentially equal to the difference between the (i) amount of rotation of the plane of polarization of the incident light reflected at or passing through said second recording layer and (ii) the amount of rotation of the plane of polarization of the incident light passing through said first recording layer, and wherein the plane of polarization of the incident light passing through said reproducing layer is rotated in a direction opposite to the direction in which the plane of polarization of the incident light is rotated when reflected at or passing through said second recording layer and passing through said first recording layer when said reproducing layer and said first and second recording layers are between room temperature and the transition temperature of said reproducing layer, such that the amount of rotation of the plane of polarization of incident light passing through said reproducing layer is canceled by the amount of rotation of the plane of polarization of incident light passing through said first recording layer and reflected at or passing through said second recording layer, and the amount of rotation of the plane of polarization of incident light passing through said overall medium is zero.

14. A magneto-optic recording medium comprising:

a transparent substrate;

a reproducing layer having a thickness of at least 50 Å and no greater than 300 Å and being an in-plane magnetized layer at room temperature, and becoming a perpendicularly magnetized layer at a transition temperature higher than room temperature, and wherein the composition and thickness of said reproducing layer are such that the plane of polarization of incident light passing through said reproducing layer when its temperature is between room temperature and the transition temperature is rotated by an angle $\theta_R$; and a recording layer comprising:
  (i) a first recording film having a thickness of at least 20 Å and no greater than 100 Å and being perpendicularly magnetizable in a temperature range of from room temperature to the Curie temperature of said first recording film, wherein the composition and thickness of said first recording film are such that the plane of polarization of incident light passing through said first recording film is rotated by a rotation angle $\theta_1$ when the temperature of said first recording film is between room temperature and the transition temperature of said reproducing layer, and
  (ii) a second recording film having a thickness of at least 20 Å and no greater than 150 Å and being perpendicularly magnetizable in a temperature range of from room temperature to the Curie temperature of said second recording film, wherein the composition and thickness of said second recording film are such that the plane of polarization of incident light reflected at or passing through said second recording film is rotated by a rotation angle $\theta_2$ when the temperature of said second recording film is between room temperature and the transition temperature of said reproducing layer, wherein said first recording film is thinner than said second recording film, and said first and second recording films each comprise an iron family element and a rare-earth element and, in each recording film, a sub-lattice magnetic moment of the iron family element and a sub-lattice magnetic moment of the rare-earth element are oriented in opposite directions, wherein at room temperature the sub-lattice magnetic moment of the iron family element contained in said second recording film is oriented in a direction opposite to the direction in which the sub-lattice magnetic moment of the iron family element contained in said first recording film is oriented, wherein said layers and said substrate are disposed in the following order: said substrate, said reproducing layer, said first recording film, and said second recording film, and wherein the composition and thicknesses of said reproducing layer and said first and second recording films are such that, when a reproducing beam is incident on said medium, the magnitude of $\theta_R$ is not zero and is essentially equal to the magnitude of $\theta_2-\theta_1$, and wherein the direction in which the plane of polarization of incident light is rotated when passing through said reproducing layer at a temperature between room temperature and the transition temperature is opposite from the direction in which the plane of polarization of incident light is rotated when reflected at or passing through said second recording film at a temperature between room temperature and the transition temperature of said reproducing layer, such that the amount of rotation of the plane of polarization of incident light passing through said reproducing layer is canceled by the amount of rotation of the plane of polarization of incident light passing through said first recording film and reflected at or passing through said second recording film, and the amount of rotation of the plane of polarization of incident light of said overall medium is zero.

* * * * *

UNITED STATES PATENT AND TRADEMARK OFFICE
CERTIFICATE OF CORRECTION

PATENT NO.    : 5,935,701

DATED         : August 10, 1999

INVENTOR(S)   : NAOKI NISHIMURA

It is certified that error appears in the above-identified patent and that said Letters Patent is hereby corrected as shown below:

ON THE TITLE PAGE

[56] In References Cited, under OTHER PUBLICATIONS: "Englishe" should read --English--.

[57] In the ABSTRACT:
Line 17, "elements" should read --element is--.

COLUMN 6

Line 4, "illustrates" should read --illustrate--.

COLUMN 8

Line 32, "ferrimagnetic" should read --ferromagnetic--.

COLUMN 9

Line 27, "the" (first occurrence) should be deleted; and
Line 29, "formula:" should read --formulas:--.

COLUMN 17

Line 42, "An" should read --A--.

UNITED STATES PATENT AND TRADEMARK OFFICE
CERTIFICATE OF CORRECTION

PATENT NO.    : 5,935,701

DATED         : August 10, 1999

INVENTOR(S)   : NAOKI NISHIMURA

It is certified that error appears in the above-identified patent and that said Letters Patent is hereby corrected as shown below:

COLUMN 20

Line 26, "magneto-optical" should read --magneto-optic--.

COLUMN 21

Lines 55-57, Claim 7 should be cancelled; and
Line 59, "7," should read --5,--.

Signed and Sealed this

Twenty-fifth Day of April, 2000

Attest:

Q. TODD DICKINSON

Attesting Officer

Director of Patents and Trademarks